United States Patent
Fujishiro et al.

(10) Patent No.: US 9,743,427 B2
(45) Date of Patent: Aug. 22, 2017

(54) COMMUNICATION CONTROL METHOD, USER TERMINAL, AND COMMUNICATION APPARATUS

(71) Applicant: KYOCERA CORPORATION, Kyoto (JP)

(72) Inventors: Masato Fujishiro, Yokohama (JP); Chiharu Yamazaki, Tokyo (JP); Kugo Morita, Yokohama (JP); Yushi Nagasaka, Yokohama (JP); Fangwei Tong, Machida (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/082,265

(22) Filed: Mar. 28, 2016

(65) Prior Publication Data

US 2016/0212766 A1 Jul. 21, 2016

Related U.S. Application Data

(63) Continuation of application No. PCT/JP2014/077146, filed on Oct. 10, 2014.
(Continued)

(30) Foreign Application Priority Data

Oct. 11, 2013 (JP) .................................. 2013-213560
Feb. 25, 2014 (JP) .................................. 2014-034211
(Continued)

(51) Int. Cl.
H04L 12/18 (2006.01)
H04W 74/00 (2009.01)
(Continued)

(52) U.S. Cl.
CPC ......... *H04W 74/006* (2013.01); *H04W 8/005* (2013.01); *H04W 52/383* (2013.01)

(58) Field of Classification Search
CPC ..... H04W 72/08; H04W 72/02; H04W 72/00; H04W 8/00; H04W 8/005; H04W 8/008;
(Continued)

(56) References Cited

U.S. PATENT DOCUMENTS

2008/0267114 A1* 10/2008 Mukherjee ............ H04L 63/107
370/315
2009/0011770 A1 1/2009 Jung et al.
(Continued)

FOREIGN PATENT DOCUMENTS

GB 2496153 A 5/2013
JP 2008-510343 A 4/2008
(Continued)

OTHER PUBLICATIONS

International Search Report issued in PCT/JP2014/077146; mailed Dec. 22, 2014.
(Continued)

*Primary Examiner* — Andrew Chriss
*Assistant Examiner* — Rasha Fayed
(74) *Attorney, Agent, or Firm* — Studebaker & Brackett PC

(57) ABSTRACT

A communication method comprises: broadcasting, from a communication apparatus to a user terminal, system information for Device to Device (D2D) proximity service, by use of a frequency of a serving cell of the user terminal, the communication apparatus managing the serving cell. The system information includes first information and second information. The first information indicates an available frequency for a discovery procedure in which the user terminal discovers another user terminal. The second infor-
(Continued)

mation indicates at least one parameter for calculating transmission power for the discovery procedure. The available frequency for the discovery procedure is a frequency different from the frequency of the serving cell. The first information is related to a center frequency of a frequency band of the available frequency for the discovery procedure.

6 Claims, 19 Drawing Sheets

Related U.S. Application Data

(60) Provisional application No. 62/056,105, filed on Sep. 26, 2014.

(30) Foreign Application Priority Data

Feb. 25, 2014 (JP) .................................. 2014-034215
Mar. 20, 2014 (JP) .................................. 2014-059277

(51) Int. Cl.
*H04W 52/38* (2009.01)
*H04W 8/00* (2009.01)

(58) Field of Classification Search
CPC ....... H04W 8/20; H04W 8/205; H04W 4/005; H04W 4/023; H04W 4/008; H04W 4/00; H04W 4/24; H04W 4/02; H04W 4/12; H04W 4/18; H04W 76/023; H04W 76/02; H04W 48/12; H04W 48/18; H04W 88/04; H04W 84/12; H04W 84/042; H04W 12/06; H04W 92/18; H04L 12/14; H04L 69/24; H04L 67/1061; H04L 67/104
USPC ......................................................... 370/329
See application file for complete search history.

(56) References Cited

U.S. PATENT DOCUMENTS

| 2012/0106504 | A1* | 5/2012 | Klatt | H04W 16/12 370/330 |
| 2012/0155377 | A1* | 6/2012 | Chai | H04W 36/0083 370/315 |
| 2013/0288608 | A1* | 10/2013 | Fwu | H04W 72/02 455/63.1 |
| 2013/0288668 | A1* | 10/2013 | Pragada | H04W 12/06 455/426.1 |
| 2013/0324114 | A1* | 12/2013 | Raghothaman | H04W 76/023 455/426.1 |
| 2014/0056220 | A1* | 2/2014 | Poitau | H04W 40/246 370/328 |
| 2014/0057667 | A1* | 2/2014 | Blankenship | H04L 67/303 455/500 |
| 2014/0094122 | A1* | 4/2014 | Etemad | H04W 76/02 455/41.2 |
| 2014/0120934 | A1 | 5/2014 | Kishiyama | |
| 2014/0185529 | A1* | 7/2014 | Lim | H04W 76/023 370/328 |
| 2014/0342747 | A1* | 11/2014 | Lee | H04L 5/0053 455/450 |
| 2014/0357269 | A1* | 12/2014 | Zhou | H04W 8/005 455/434 |
| 2014/0378140 | A1* | 12/2014 | Gopal | H04W 76/048 455/437 |
| 2015/0043448 | A1* | 2/2015 | Chatterjee | H04W 8/005 370/329 |
| 2015/0245193 | A1* | 8/2015 | Xiong | H04W 76/023 370/328 |
| 2015/0327047 | A1* | 11/2015 | Tiirola | H04W 8/005 370/338 |

FOREIGN PATENT DOCUMENTS

| JP | 2009-017560 A | 1/2009 |
| JP | 2013-034165 A | 2/2013 |
| WO | 2006/016330 A1 | 2/2006 |
| WO | 2012/088470 A1 | 6/2012 |
| WO | 2012/166969 A1 | 12/2012 |

OTHER PUBLICATIONS

Written Opinion issued in PCT/JP2014/077146; mailed Dec. 22, 2014.
3rd Generation Partnership Project; Technical Specification Group Services and System Aspects; Feasibility study for Proximity Services (ProSe); 3GPP TR 22.803; V12.2.0; Jun. 2013; pp. 1-45; Release 12; 3GPP Organizational Partners.
Huawei, HiSilicon; RAN2 considerations for D2D communication; 3GPP TSG RAN WG2 Meeting #83; R2-132757; Aug. 19-23, 2013; pp. 1-9; Barcelona, Spain.
ZTE; On D2D UE capability, D2D interest and prioritization; 3GPP TSG-RAN WG2 Meeting #87; R2-143596; Aug. 18-22, 2014; pp. 1-6; Dresden, Germany.
An Office Action; "Notice of Reasons for Rejection"; mailed by the Japanese Patent Office on Sep. 1, 2015, which corresponds to Japanese Patent Application No. 2015-526778; with English Statement of Relevance.
An Office Action; "Notice of Reasons for Rejection"; mailed by the Japanese Patent Office on Sep. 1, 2015, which corresponds to Japanese Patent Application No. 2015-106427; with English Statement of Relevance.
An Office Action; "Notice of Reasons for Rejection"; mailed by the Japanese Patent Office on Sep. 1, 2015, which corresponds to Japanese Patent Application No. 2015-106467; with English Statement of Relevance.
An Office Action; "Notice of Reasons for Rejection"; mailed by the Japanese Patent Office on Jan. 26, 2016, which corresponds to Japanese Patent Application No. 2015-106467; with English Statement of Relevance.
The extended European search report issued by the European Patent Office on May 30, 2017, which corresponds to European Patent Application No. 14852433.3-1857 and is related to U.S. Appl. No. 15/082,265; 7pp.

* cited by examiner

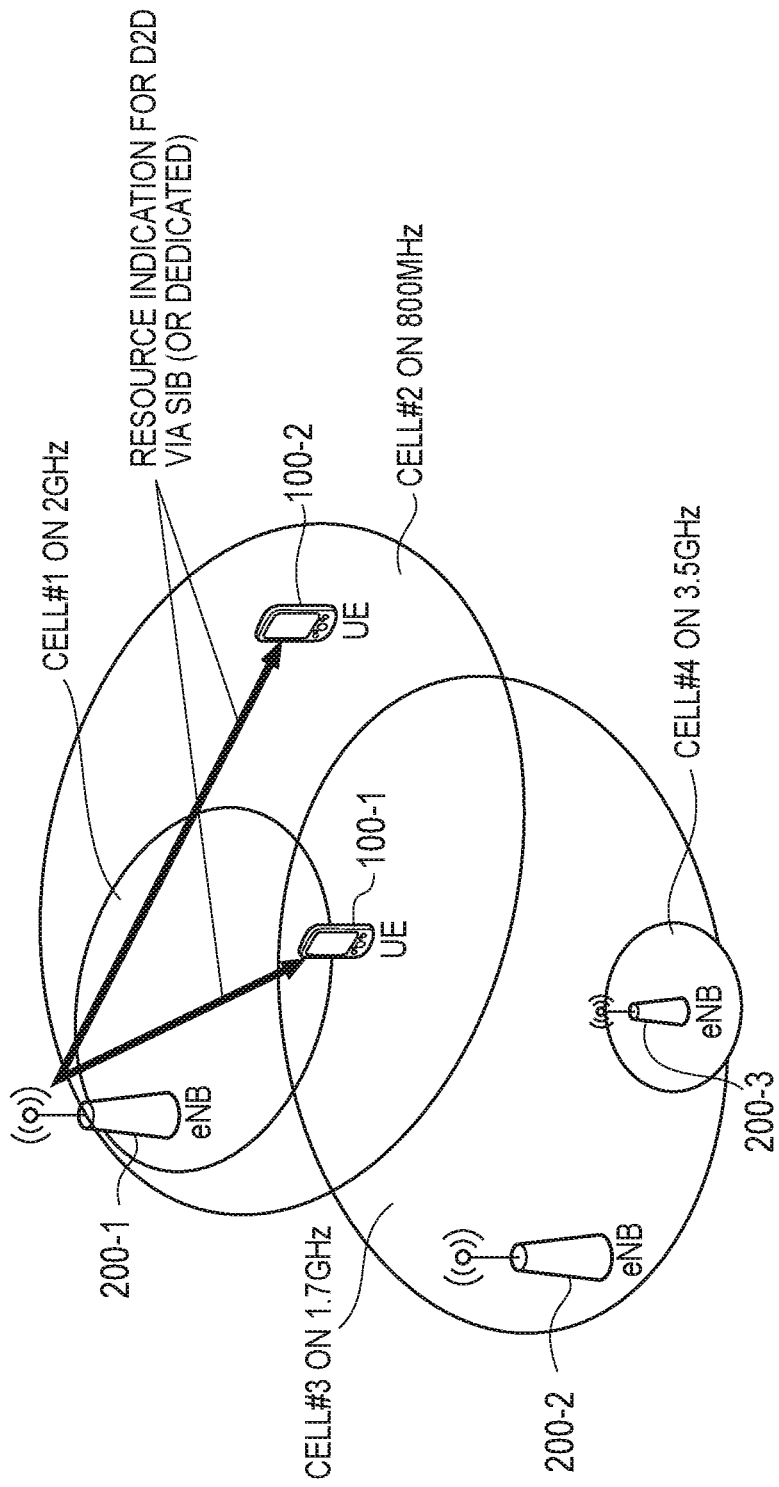

FIG. 8

CONTENTS OF RESOURCE INDICATION INFORMATION

| | |
|---|---|
| CENTER FREQUENCY | I1 |
| SYSTEM BANDWIDTH(# OF RBs) | I2 |
| LIST(s) OF RBs FOR D2D IN THE SYSTEM BANDWIDTH(OPTIONAL) | I3 |

ADDITIONAL PARAMETERS FOR EACH BAND OR LIST OF D2D RBs

| | |
|---|---|
| CORRESPONDING TPC PARAMETERS(OPTIONAL) | I4 |
| CORRESPONDING USE CASE(OPTIONAL) | I5 |
| AVAILABLE SUBFRAME(OPTIONAL) | I6 |
| AVAILABLE CONDITION(OPTIONAL) | I7 |
| SYNCHRONIZATION TARGET(OPTIONAL) | I8 |

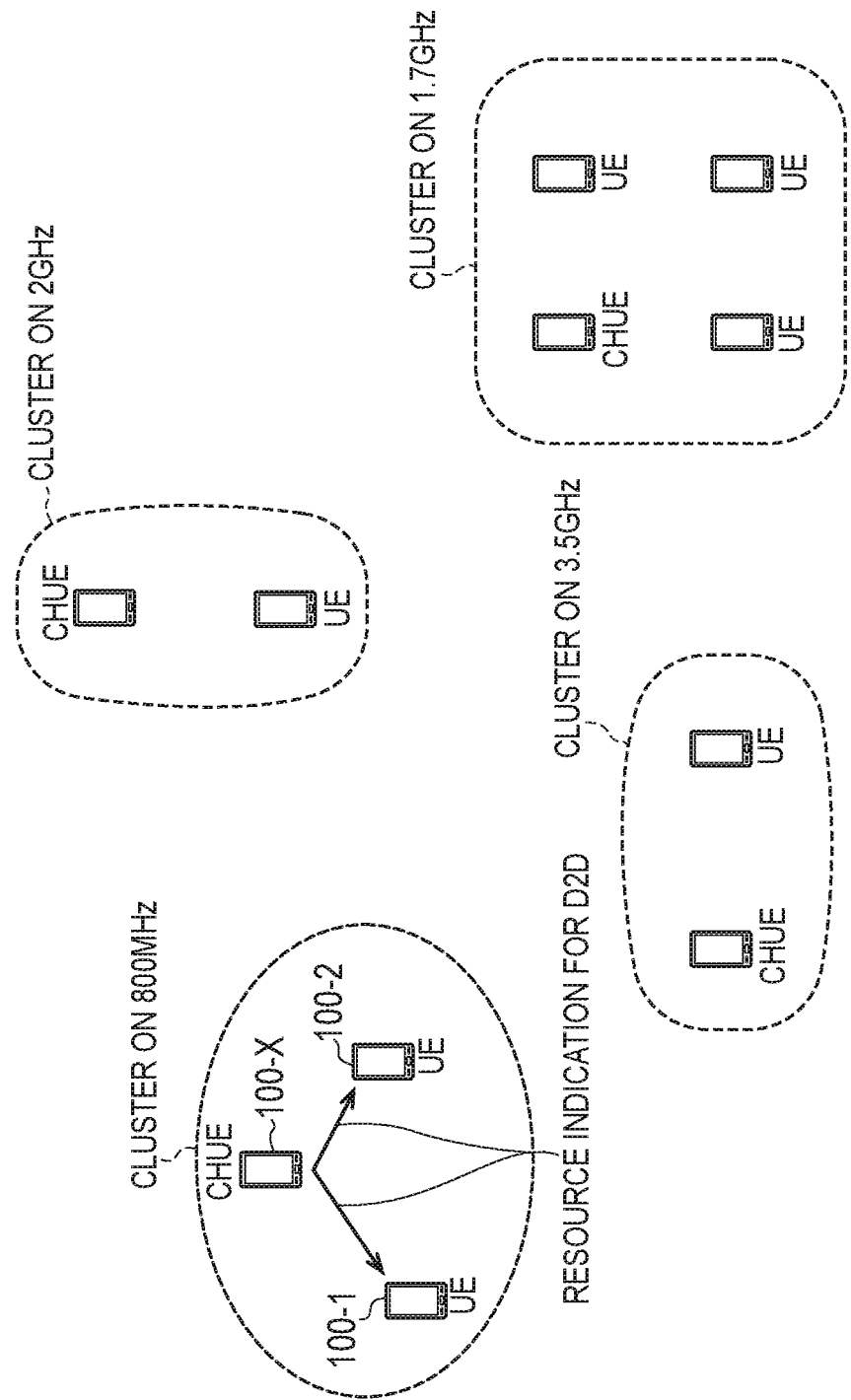

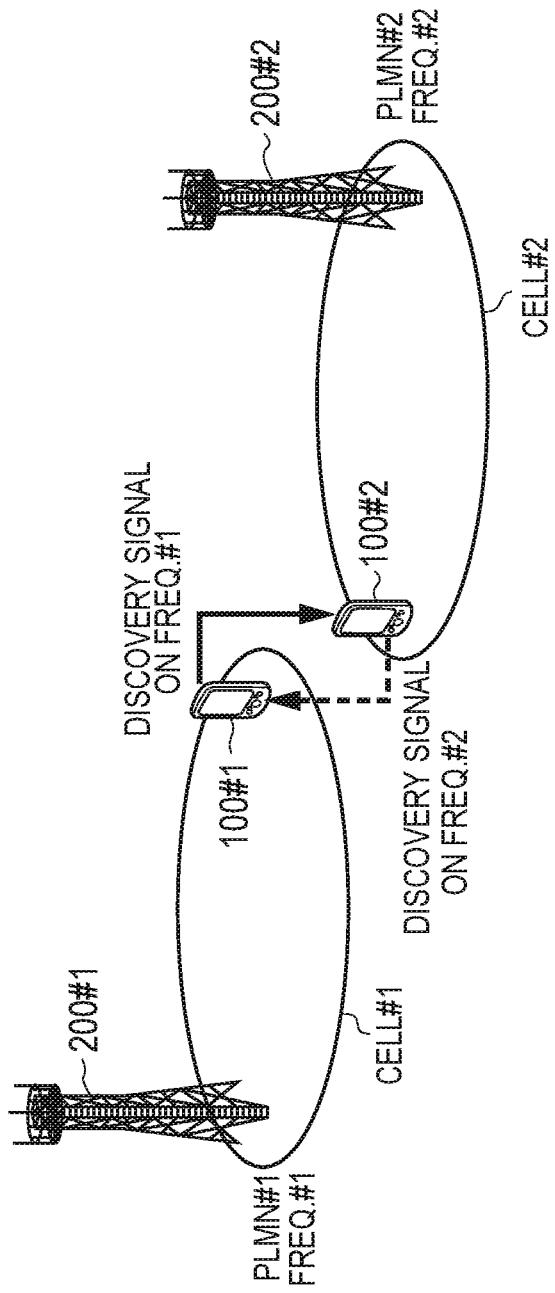

COMMUNICATION CONTROL METHOD, USER TERMINAL, AND COMMUNICATION APPARATUS

RELATED APPLICATIONS

This application is a continuation application of international application PCT/JP2014/077146, filed Oct. 10, 2014, which claims benefit of JP Patent Application 2013-213560, filed Oct. 11, 2013, JP Patent Application 2014-034211, filed Feb. 25, 2014, JP Patent Application 2014-034215, filed Feb. 25, 2014, JP Patent Application 2014-059277, filed Mar. 20, 2014, and U.S. Provisional Application 62/056,105, filed Sep. 26, 2014, the entirety of all applications hereby expressly incorporated by reference.

TECHNICAL FIELD

The present disclosure relates to a communication control method that supports D2D proximity service, a user terminal thereof, and a communication apparatus thereof.

BACKGROUND ART

In 3GPP (3rd Generation Partnership Project) which is a project aiming to standardize a mobile communication system, the introduction of Device to Device (D2D) communication is discussed as a new function after Release 12 (see Non Patent Document 1.)

The D2D proximity service (D2D ProSe) is a service enabling direct device-to-device communication within a synchronization cluster formed by a plurality of synchronized user terminals. The D2D proximity service includes a D2D discovery procedure (Discovery) in which a proximal terminal is discovered and D2D communication (Communication) that is direct device-to-device communication.

PRIOR ART DOCUMENT

Non-Patent Document

Non Patent Document 1: 3GPP technical report "TR 22.803 V12.2.0" June, 2013

SUMMARY

A communication method according to one embodiment comprises: broadcasting, from a communication apparatus to a user terminal, system information for Device to Device (D2D) proximity service, by use of a frequency of a serving cell of the user terminal, the communication apparatus managing the serving cell. The system information includes first information and second information. The first information indicates an available frequency for a discovery procedure in which the user terminal discovers another user terminal. The second information indicates at least one parameter for calculating transmission power for the discovery procedure. The available frequency for the discovery procedure is a frequency different from the frequency of the serving cell. The first information is related to a center frequency of a frequency band of the available frequency for the discovery procedure.

A communication apparatus according to one embodiment comprises: a processor configured to perform a process of broadcasting, to a user terminal, system information for Device to Device (D2D) proximity service, by use of a frequency of a serving cell. The system information includes first information and second information. The first information indicates an available frequency for a discovery procedure in which the user terminal discovers another user terminal. The second information indicates at least one parameter for calculating transmission power for the discovery procedure. The available frequency for the discovery procedure is a frequency different from the frequency of the serving cell. The first information is related to a center frequency of a frequency band of the available frequency for the discovery procedure.

A user terminal according to one embodiment comprises: a processor configured to perform a process of receiving system information for Device to Device (D2D) proximity service, by use of a frequency of a serving cell of the user terminal, from a communication apparatus managing the serving cell. The system information includes first information and second information. The first information indicates an available frequency for a discovery procedure in which the user terminal discovers another user terminal. The second information indicates at least one parameter for calculating transmission power for the discovery procedure. The available frequency for the discovery procedure is a frequency different from the frequency of the serving cell. The first information is related to a center frequency of a frequency band of the available frequency for the discovery procedure.

BRIEF DESCRIPTION OF THE DRAWINGS

FIG. 7 is a diagram for describing an operation according to the embodiment.

FIG. 8 is a diagram for describing a D2D resource notification according to the embodiment.

FIG. 9 is a diagram for describing an operation according to another embodiment.

FIG. 10 is a diagram showing an operation environment according to the embodiment.

DESCRIPTION OF THE EMBODIMENT

Overview of Embodiment

Figure 1:
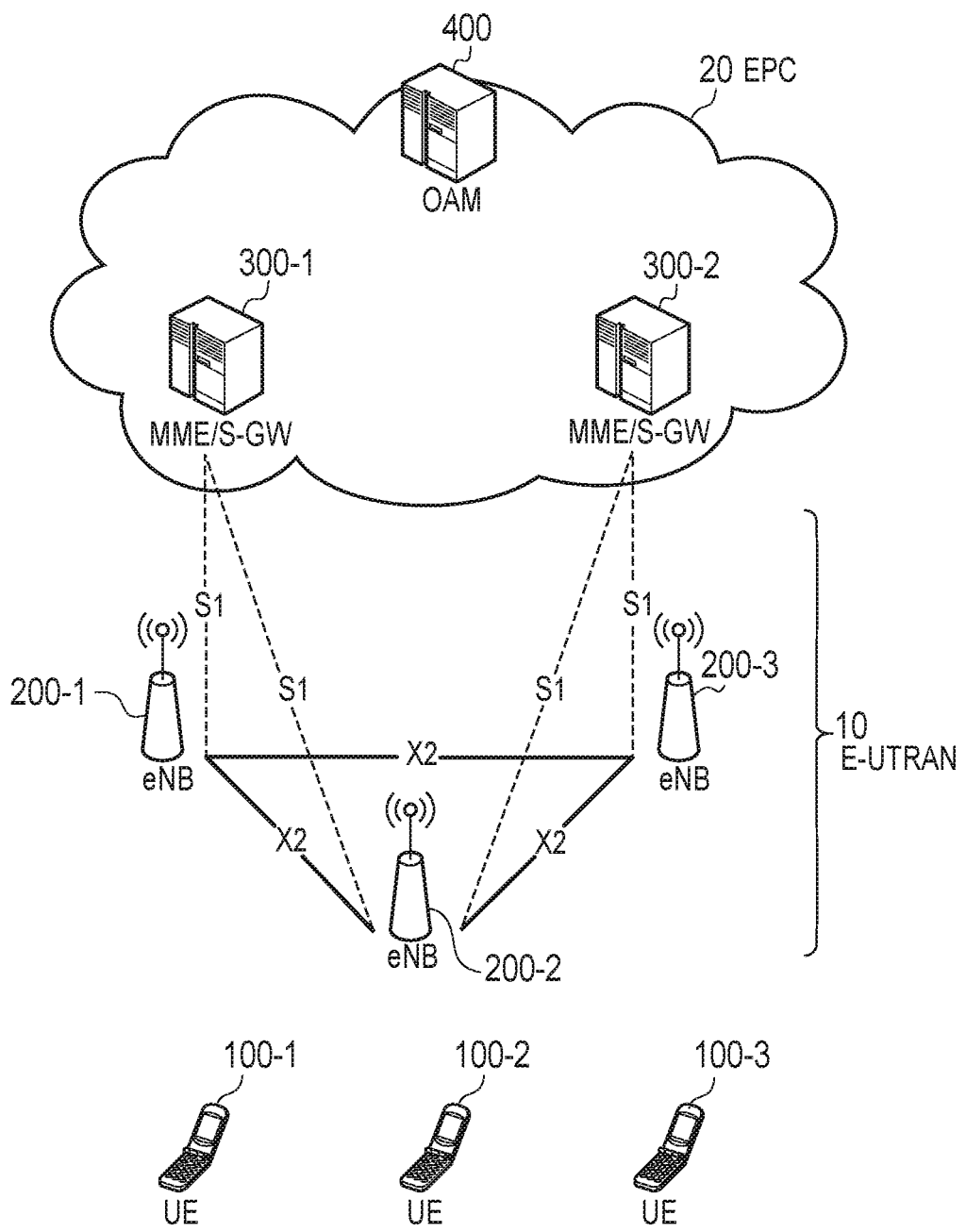
FIG. 1 is a configuration diagram of an LTE system according to embodiments.

Incidentally, in order to avoid interference between cellular communication and transmission and reception of a D2D radio signal by using a D2D proximity service such as D2D communication, it is assumed that the D2D proximity service is used under the management of a communication apparatus such as a base station.

For example, in a cell in which a user terminal exists, a radio resource (D2D radio resource) available for D2D communication is reserved from among frequency bands to which the cell belongs to notify the user terminal of the D2D radio resource.

However, such a method has a problem in that when the D2D radio resource is reserved, the radio resources available for the cellular communication relatively reduce.

A communication method according to an embodiment comprises: broadcasting, from a communication apparatus to a user terminal, system information for Device to Device (D2D) proximity service, by use of a frequency of a serving cell of the user terminal, the communication apparatus managing the serving cell. The system information includes first information and second information. The first information indicates an available frequency for a discovery procedure in which the user terminal discovers another user terminal. The second information indicates at least one parameter for calculating transmission power for the discovery procedure. The available frequency for the discovery procedure is a frequency different from the frequency of the serving cell. The first information is related to a center frequency of a frequency band of the available frequency for the discovery procedure.

A communication apparatus according to an embodiment comprises: a processor configured to perform a process of broadcasting, to a user terminal, system information for Device to Device (D2D) proximity service, by use of a frequency of a serving cell. The system information includes first information and second information. The first information indicates an available frequency for a discovery procedure in which the user terminal discovers another user terminal. The second information indicates at least one parameter for calculating transmission power for the discovery procedure. The available frequency for the discovery procedure is a frequency different from the frequency of the serving cell. The first information is related to a center frequency of a frequency band of the available frequency for the discovery procedure.

A user terminal according to an embodiment comprises: a processor configured to perform a process of receiving system information for Device to Device (D2D) proximity service, by use of a frequency of a serving cell of the user terminal, from a communication apparatus managing the serving cell. The system information includes first information and second information. The first information indicates an available frequency for a discovery procedure in which the user terminal discovers another user terminal. The second information indicates at least one parameter for calculating transmission power for the discovery procedure. The available frequency for the discovery procedure is a frequency different from the frequency of the serving cell. The first information is related to a center frequency of a frequency band of the available frequency for the discovery procedure.

First Embodiment

Hereinafter, a first embodiment in which the present disclosure applies to the LTE system will be described.

(System Configuration) FIG. 1 is a configuration diagram of an LTE system according to the first present embodiment. As illustrated in FIG. 1, the LTE system according to the first embodiment comprises UEs (User Equipments) 100, E-UTRAN (Evolved Universal Terrestrial Radio Access Network) 10, and EPC (Evolved Packet Core) 20.

The UE 100 corresponds to the user terminal. The UE 100 is a mobile communication apparatus and performs radio communication with a cell (a serving cell) for a connection destination. Configuration of UE 100 will be described later.

The E-UTRAN 10 corresponds to a radio access network. The E-UTRAN 10 includes a plurality of eNBs 200 (evolved Node-Bs). The eNB 200 corresponds to a base station. The eNBs 200 are connected mutually via an X2 interface. Configuration of eNB 200 will be described later.

The eNB 200 manages one cell or a plurality of cells and performs radio communication with the UE 100 that establishes a connection with the cell. The eNB 200 has a radio resource management (RRM) function, a routing function of user data, and a measurement control function for mobility control and scheduling and the like. It is noted that the "cell" is used as a term indicating a minimum unit of a radio communication area, and is also used as a term indicating a frequency band or a function of performing radio communication with the UE 100.

The EPC 20 corresponds to a core network. The E-UTRAN 10 and the EPC 20 constitute a network of the LTE system. The EPC 20 includes MMEs (Mobility Management Entities)/S-GWs (Serving-Gateways) 300 and an OAM (Operation and Maintenance) 400. The MME performs various mobility controls and the like, for the UE 100. The S-GW performs transfer control of user data. The eNB 200 is connected to the MME/S-GW 300 via an S1 interface. The OAM 400 is a server device managed by an operator and performs maintenance and monitoring of the E-UTRAN 10.

Figure 2:
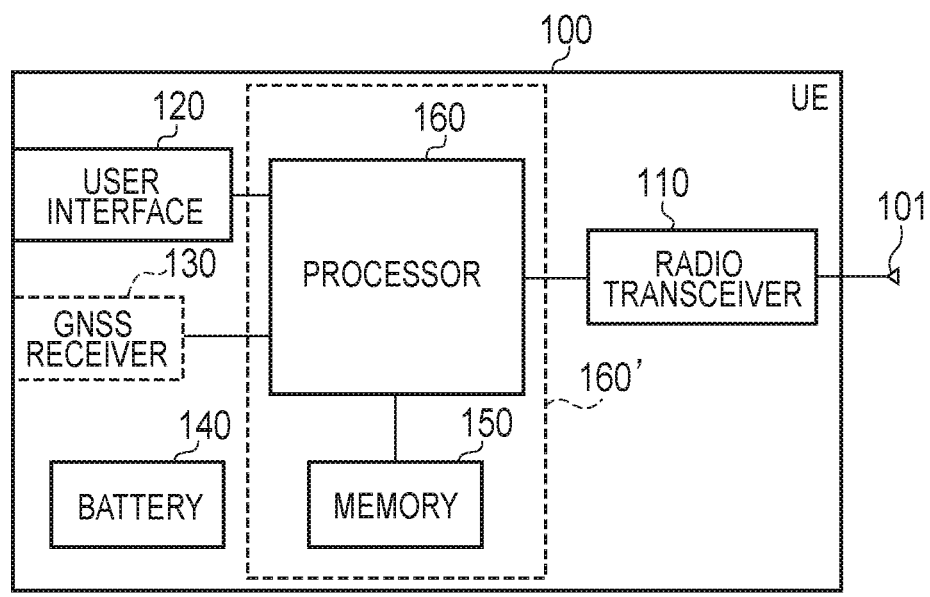
FIG. 2 is a block diagram of a UE according to the embodiments.

FIG. 2 is a block diagram of the UE 100. As illustrated in FIG. 2, the UE 100 comprises an antenna 101, a radio transceiver 110, a user interface 120, a GNSS (Global Navigation Satellite System) receiver 130, a battery 140, a memory 150, and a processor 160. The memory 150 and the processor 160 constitute a controller. The UE 100 may not have the GNSS receiver 130. Furthermore, the memory 150 may be integrally formed with the processor 160, and this set (that is, a chipset) may be called a processor 160'.

The antennas 101 and the radio transceiver 110 are used to transmit and receive a radio signal. The radio transceiver 110 converts a baseband signal (transmitted signal) output from the processor 160 into the radio signal, and transmits the radio signal from the antennas 101. Furthermore, the radio transceiver 110 converts the radio signal received by the antennas 101 into the baseband signal (received signal), and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
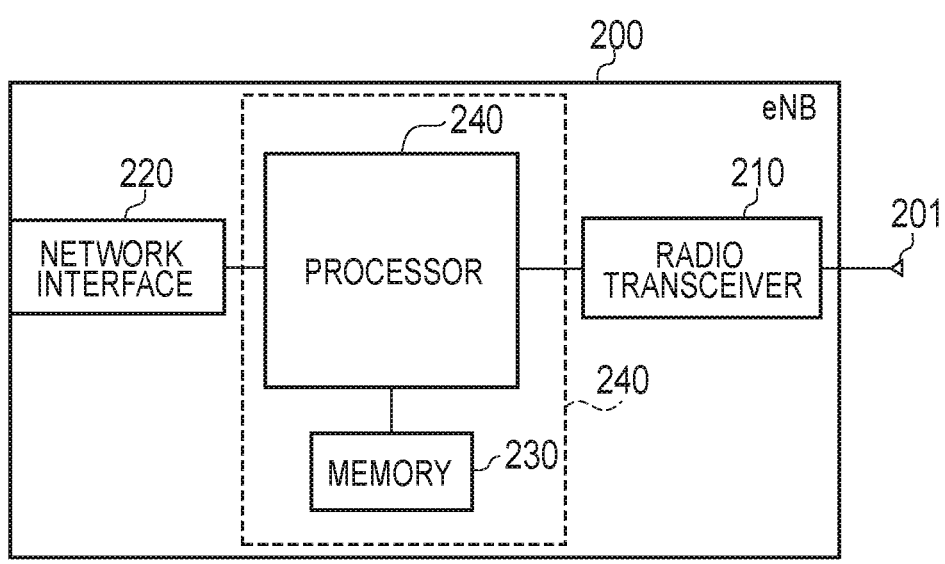
FIG. 3 is a block diagram of an eNB according to the embodiments.

FIG. 3 is a block diagram of the eNB 200. As illustrated in FIG. 3, the eNB 200 comprises an antenna 201, a radio transceiver 210, a network interface 220, a memory 230, and a processor 240. The memory 230 and the processor 240 constitute a controller. It is noted that the memory 230 may be integrally formed with the processor 240, and this set (that is, a chipset) may be called a processor.

The antenna 201 and the radio transceiver 210 are used to transmit and receive a radio signal. The radio transceiver 210 converts the baseband signal (transmitted signal) output from the processor 240 into the radio signal, and transmits the radio signal from the antenna 201. Furthermore, the radio transceiver 210 converts the radio signal received by the antenna 201 into the baseband signal (received signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like of the baseband signal and a CPU that performs various processes by executing the program stored in the memory 230. The processor 240 implements various processes and various communication protocols described later.

Figure 4:
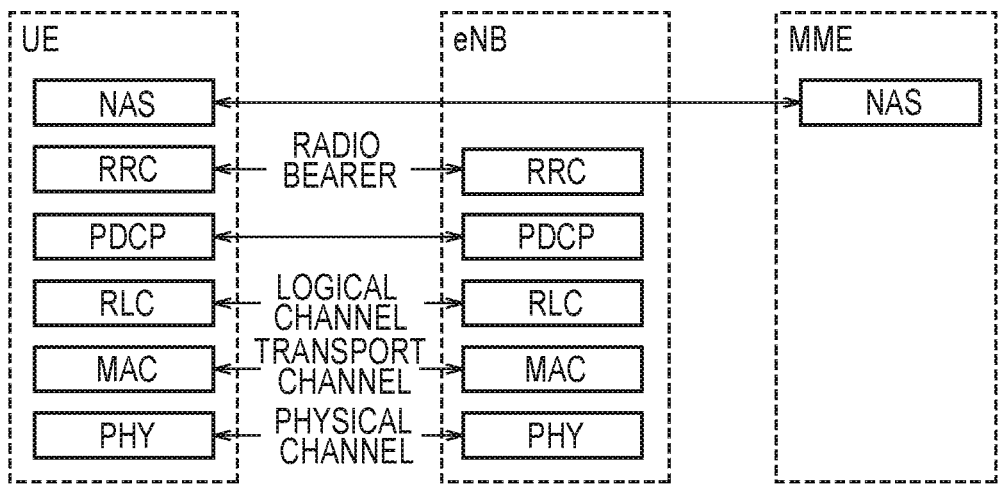
FIG. 4 is a protocol stack diagram of a radio interface according to the embodiments.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and control signal are transmitted through the physical channel.

The MAC layer performs preferential control of data, and a retransmission process and the like by hybrid ARQ (HARQ). Between the MAC layer of the UE 100 and the MAC layer of the eNB 200, user data and control signal are transmitted via a transport channel. The MAC layer of the eNB 200 includes a scheduler for determining (scheduling) a transport format of an uplink and a downlink (a transport block size, a modulation and coding scheme) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane which treats the control signal. Between the RRC layer of the UE 100 and the RRC layer of the eNB 200, a control signal (an RRC message) for various types of configurations is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in a connected state (a RRC connection state), and when the RRC connection is not established, the UE 100 is in an idle state (a RRC idle state).

A NAS (Non-Access Stratum) layer positioned above the RRC layer performs session management and mobility management, for example.

Figure 5:
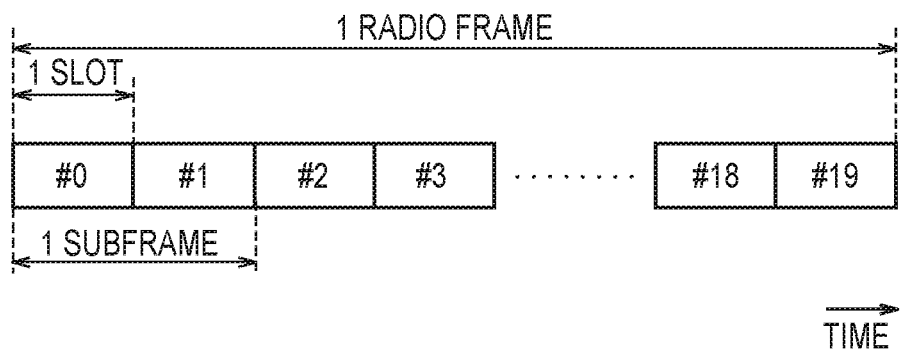
FIG. 5 is a configuration diagram of a radio frame according to the embodiments.

FIG. 5 is a configuration diagram of a radio frame used in the LTE system. In the LTE system, OFDMA (Orthogonal Frequency Division Multiple Access) is applied in a downlink (DL), and SC-FDMA (Single Carrier Frequency Division Multiple Access) is applied in an uplink (UL), respectively.

As illustrated in FIG. 5, the radio frame (system frame) is configured by 10 subframes arranged in a time direction, wherein each subframe is configured by two slots arranged in the time direction. Each subframe has a length of 1 ms and each slot has a length of 0.5 ms. Each slot includes a plurality of resource blocks (RBs) in a frequency direction, and a plurality of symbols in the time direction. Each resource block includes a plurality of subcarriers in the frequency direction. A radio resource unit is configured by one subcarrier and one symbol.

Among radio resources assigned to the UE 100, a frequency resource can be configured by a resource block and a time resource can be configured by a subframe (or slot).

In the downlink, an interval of several symbols at the head of each subframe is a region mainly used as a physical downlink control channel (PDCCH) for transmission of a downlink control signal. Furthermore, the remaining part of each subframe is a region mainly used as a physical downlink shared channel (PDSCH) for transmission of a downlink user data.

In the uplink, both end portions in the frequency direction of each subframe are regions mainly used as a physical uplink control channel (PUCCH) for transmission of an uplink control signal. Furthermore, the center portion in the frequency direction of each subframe is a region that can be mainly used as a physical uplink shared channel (PUSCH) for transmission of an uplink user data.

(D2D Proximity Service)

A D2D proximity service will be described, below. An LTE system according to the first embodiment supports the D2D proximity service. The D2D proximity service is described in Non Patent Document 1. An outline thereof will be presented here.

The D2D proximity service (D2D ProSe) is a service enabling a direct UE-to-UE communication within a synchronization cluster formed by a plurality of synchronized UEs 100. The D2D proximity service includes a D2D discovery procedure (Discovery) in which a proximal UE is discovered and D2D communication (Communication) that is direct UE-to-UE communication. The D2D communication is also called Direct Communication.

A scenario in which all the UEs 100 forming the synchronization cluster are located inside a cell coverage is called "In coverage". A scenario in which all the UEs 100 forming the synchronization cluster are located outside the cell coverage is called "Out of coverage". A scenario in which some UEs 100 in the synchronization cluster are located in the cell coverage and the remaining UEs 100 are located outside the cell coverage is called "Partial coverage".

In coverage, an eNB 200 is a D2D synchronization source, for example. A D2D asynchronization source, from which a D2D synchronization signal is not transmitted, is synchronized with the D2D synchronization source. The eNB 200 that is a D2D synchronization source transmits, by a broadcast signal, D2D resource information relating to a D2D radio resource available for the D2D proximity service, as a D2D resource notification. The D2D resource information includes information indicating a radio resource available for the D2D discovery procedure (Discovery resource information) and information indicating a radio resource available for the D2D communication (Communication resource information), for example. The UE 100 that is a D2D asynchronization source performs the D2D discovery procedure and the D2D communication on the basis of the D2D resource information received from the eNB 200.

Out of coverage or in Partial coverage, the UE 100 is the D2D synchronization source, for example Out of coverage, the UE 100 that is a D2D synchronization source transmits the D2D resource information indicating a radio resource available for the D2D proximity service, by a D2D synchronization signal, for example. The D2D synchronization signal is a signal transmitted in the D2D synchronization procedure in which a device-to-device synchronization is established. The D2D synchronization signal includes D2DSS and a physical D2D synchronization channel (PD2DSCH). The D2DSS is a signal for providing a synchronization reference of a time and a frequency. The PD2DSCH is a physical channel through which more information can be conveyed than the D2DSS. The PD2DSCH conveys the above-described D2D resource information (the Discovery resource information and the Communication resource information). Alternatively, when the D2DSS is associated with the D2D resource information, the PD2DSCH may be rendered unnecessary.

The D2D discovery procedure is used mainly when the D2D communication is performed by unicast. One UE 100 uses any particular radio resource out of radio resources available for the D2D discovery procedure when starting the D2D communication with another UE 100 to transmit the Discovery signal (D2D discovery signal). The other UE 100 scans the Discovery signal within the radio resources available for the D2D discovery procedure when starting the D2D communication with the one UE 100 to receive the Discovery signal. The Discovery signal may include information indicating a radio resource used by the one UE 100 for the D2D communication.

Figure 6:
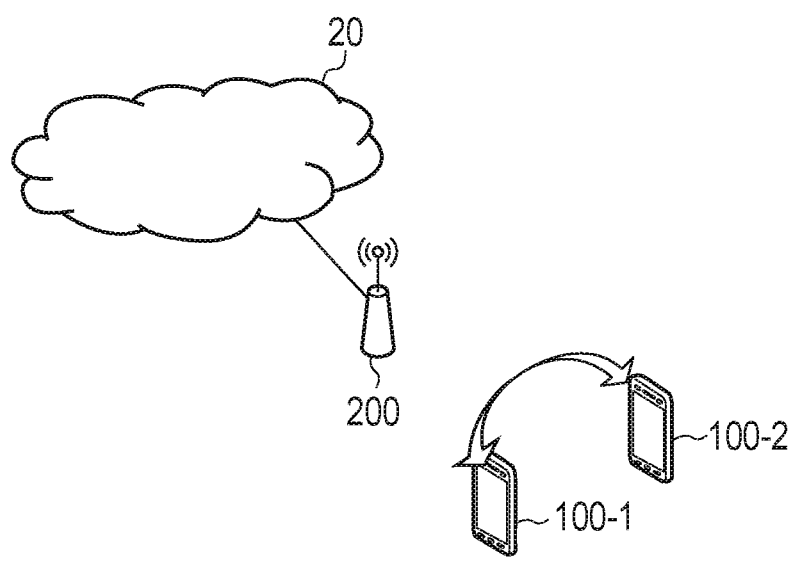
FIG. 6 is a diagram for illustrating the D2D communication according to the embodiments.

Next, the D2D communication is used as an example to proceed with description with a comparison between cellular communication that is ordinary communication in the LTE system and radio communication in the D2D proximity service. FIG. 6 is a diagram for describing the D2D proximity service (for example, the D2D communication) according to the first embodiment.

The cellular communication is a communication mode in which a data path is made through a network (E-UTRAN 10, EPC 20). The data path is a transmission path for user data.

On the other hand, as shown in FIG. 6, the radio communication in the D2D proximity service is a communication mode in which a data path set between the UEs is made without a network. A D2D UE group formed by a plurality of UEs 100 (UE 100-1 and UE 100-2) adjacent to each other directly performs radio communication with low transmission power. As described above, such a D2D UE group is a "cluster" (synchronization cluster).

The UE 100-1 and the UE 100-2 are synchronized with each other. Each of the UE 100-1 and the UE 100-2 may recognize the other UE by a proximity discovery (Discovery) process. It is noted that in the first embodiment (and some of the other embodiments described later), the "Discovery process" may be included in the "D2D communication". That is, it should be noted that the radio communication in the D2D proximity service (specifically, the radio communication in the D2D discovery procedure (Discovery) and the radio communication in the D2D communication (Communication)) may be generally called "D2D communication".

A frequency band of the D2D communication may be used commonly with a frequency band of the cellular communication, or may be different from the frequency band of the cellular communication. Thus, when the plurality of proximity UEs 100 directly perform radio communication with low transmission power, it becomes possible to reduce a power consumption of the UE 100 in comparison with in cellular communication.

In the first embodiment, as a mode of the D2D communication in a lower layer, broadcast is mainly assumed. For example, CSMA (Carrier Sense Multiple Access) is applied to the D2D communication. The D2D communication performed by such a broadcast is especially suitably applied to public safety in a time of disaster or the like. It is noted that the D2D communication can be applied to a group-cast (multicast) or a unicast by performing encryption or the like in an upper layer.

It is noted that the In coverage case includes an "Intra-cell" case where each UE 100 forming the synchronization cluster exists in the same cell and an "Inter-cell" case where each UE 100 forming the synchronization cluster exists dispersively in a plurality of cells.

(Operation According to First Embodiment)

FIG. 7 is a diagram for describing an operation according to the first embodiment. FIG. 8 is a diagram for describing a D2D resource notification according to the first embodiment.

As shown in FIG. 7, a plurality of cells belonging to respectively different frequency bands is arranged. An eNB 200-1 manages a cell #1 belonging to a 2-GHz band and a cell #2 belonging to an 800-MHz band. An eNB 200-2 manages a cell #3 belonging to a 1.7-GHz band. An eNB 200-3 manages a cell #4 belonging to a 3.5-GHz band. The cell #4 is a small cell (for example, a pico cell or a femto cell) arranged inside the cell #3. For example, the 800-MHz band, the 1.7-GHz band, the 2-GHz band, and the 3.5-GHz band are operator bands assigned to the same operator. Each of the 800-MHz band, the 1.7-GHz band, the 2-GHz band, and the 3.5-GHz band may be used as a component carrier in a carrier aggregation. Each of the component carriers includes a plurality of resource blocks in a frequency direction.

In the cell #2, a plurality of UEs 100 exists. The cell #2 is a serving cell of the UEs 100. The UEs 100 may be in an RRC connected state in the cell #2, and in an RRC idle state in the cell #2. The UE 100-1 of the plurality of UEs 100 is located inside a region where the cell #2 and the cell #3 overlap and near the cell #1. The UE 100 wishes to start the D2D communication, or is performing the D2D communication.

When the D2D communication in such In coverage is assumed, the D2D communication may be performed under the management of the eNB 200 in order to avoid interference between the D2D communication and the cellular communication. For example, the eNB 200-1 reserves a D2D radio resource (a resource block, a subframe, etc.) available for the D2D communication, out of the 800-MHz band to which the cell #2 belongs, and notifies the UE 100 of the D2D radio resource. However, in such a method, the radio resources available for the cellular communication relatively reduce due to reserving the D2D radio resource.

Therefore, in the first embodiment, when the frequency band different from the 800-MHz band to which the cell #2 belongs is made available for the UE 100-1 and the UE 100-2 to use for the D2D communication, it becomes possible to perform the D2D communication without reducing the radio resources available for the cellular communication.

A communication control method according to the first embodiment comprises: a transmission step of transmitting, by the eNB 200-1 configured to use the 800-MHz band for the cellular communication, at least one D2D resource notification (Resource indication for D2D) in the 800-MHz band; and a reception step of receiving, by the UE 100, the D2D resource notification transmitted in the 800-MHz band. In the first embodiment, the 800-MHz band corresponds to a predetermined frequency band. The eNB 200-1 corresponds to a communication apparatus configured to use the predetermined frequency band. In the following description, description proceeds with a focus on the D2D resource notification transmitted by the eNB 200-1 in the 800-MHz band.

The D2D resource notification (D2D resource information) includes information indicating the D2D frequency band that is a frequency band available for the D2D communication. In the first embodiment, the D2D frequency band is a frequency band different from the 800-MHz band. In an operation environment shown in FIG. 7, the cell #4 belonging to the 3.5-GHz band is located far from the cell #2 belonging to the 800-MHz band, and thus, in view of avoiding interference, it is preferable that the D2D frequency band in the cell #2 is a 3.5-GHz band.

On the other hand, the cell #1 belonging to the 2-GHz band is located in the cell #2, and thus, in view of avoiding interference, it is not preferable that the D2D frequency band in the cell #2 is a 2-GHz band. Further, the cell #3 belonging to the 1.7-GHz band neighbors the cell #2, and thus, in view of avoiding interference, it is not preferable that the D2D frequency band in the cell #2 is a 1.7-GHz band. However, although the description is given in detail later, as long as a predetermined condition to avoid interference is satisfied, the 1.7-GHz band and the 2-GHz band may be made available in the cell #2 for the D2D communication.

It is noted that the eNB 200-1 performs base-station-to-base-station communication with neighboring eNBs (the eNB 200-2 and the eNB 200-3) to thereby determine the D2D frequency band. Alternatively, the D2D frequency band determined by the EPC 20 may be notified and set to the eNB 200-1.

In the first embodiment, the eNB 200-1 includes the information indicating the D2D frequency band, into the D2D resource notification, as long as the D2D frequency band is a frequency band different from the 800-MHz band. That is, when the 800-MHz band is the D2D frequency band, the eNB 200-1 may not include the information indicating the D2D frequency band into the D2D resource notification.

In the first embodiment, the eNB 200-1 transmits the D2D resource notification by broadcast in the 800-MHz band. The UE 100 receives the D2D resource notification transmitted by broadcast in the 800-MHz band. For example, the D2D resource notification may be an information element of an SIB (System Information Block) that is an RRC message common to all the UEs in the cell #2. When the D2D resource notification is transmitted by the SIB, it becomes possible even for the UE 100 in an RRC idle state to acquire the D2D resource notification. However, it is not limited to transmitting the D2D resource notification by broadcast, and it may be possible to transmit the D2D resource notification by unicast to the UE 100 in an RRC connected state.

As shown in FIG. 8, the information indicating the D2D frequency band includes information I1 indicating a center frequency of the D2D frequency band, and information I2 indicating a bandwidth of the D2D frequency band. The information I2 is the number of resource blocks corresponding to a bandwidth in a D2D frequency band, for example.

Further, the D2D resource notification (D2D resource information) may include the information indicating a D2D radio resource that is a radio resource available for the D2D communication, out of a plurality of radio resources corresponding to the D2D frequency band. The information indicating a D2D radio resource is information I3 indicating a resource block configuring the D2D radio resource. The information I3 is a resource block number, for example. The information indicating a D2D radio resource may be information I6 indicating a subframe configuring the D2D radio resource. The information I6 is a subframe number, for example.

The D2D resource notification (D2D resource information) may include a transmission power control parameter I4 applied to D2D communication that uses the D2D frequency band and/or the D2D radio resource. The transmission power control parameter I4 is a maximum transmission power "PMax" of the D2D communication, for example. The UE 100 determines the D2D transmission power "P" by the following calculating formula:

$$P = \mathrm{Min}(P\mathrm{Max}, \mathrm{Min}(I\mathrm{Max} + PL\mathrm{Cell}, PO\_\mathrm{Nominal}\_D2D + \alpha PLD2D))$$

"IMax" denotes restriction on interference to a cell, "PLCell" denotes a path loss with a cell, "PO_Nominal_D2D" denotes D2D transmission power that serves as a base, "α" denotes a path loss compensation factor, and "PLD2D" denotes a path loss with a D2D communication partner. When the above-described calculating formula is used, the transmission power control parameter I4 may include "IMax", "PO_Nominal_D2D", and "α". It is noted that "PO_Nominal_D2D" may be a value unique to a UE.

However, it is not limited that the D2D radio resource and/or the D2D transmission power implicitly may be indicated in the D2D resource notification. The D2D radio resource and/or the D2D transmission power may be implicitly indicated. In this case, the D2D resource notification may include information I5 indicating a use case where the D2D frequency band (and/or the D2D radio resource) is used for the D2D communication. The use case is associated with a transmission power control parameter applied to the D2D communication, and/or the D2D radio resource that is a radio resource available for the D2D communication. For example, when the D2D radio resource is not designated in the D2D resource notification, the use case may be associated with the D2D radio resource. When the D2D transmission power control parameter is not designated in the D2D resource notification, the use case may be associated with the D2D transmission power control parameter.

The use case is Commercial or Public safely. For example, a rule that "in Commercial, the maximum D2D transmission power is 23 dBm, and in Public safety, the maximum D2D transmission power may exceed 23 dBm" is previously set to the UE 100, and the UE 100 controls the D2D transmission power in accordance with the rule. It is noted that each of Commercial and Public safety may be further categorized.

Instead of the above-described rule, a rule that uses "UE power class" (see TS36.101) may be applied. For example, a rule that "in Public safety, UE power class 1 (31 dBm) is applied" may be used.

The D2D resource notification (D2D resource information) may include information I7 indicating an available condition that is a condition under which a D2D frequency band is available. The UE 100 determines on the basis of the information I7 indicating an available condition whether or not the D2D frequency band can be available for the D2D communication.

The available condition is at least one of: search (for example, a cell search) for a D2D frequency band is not successful; and a measurement result (for example, reference signal received power) for a D2D frequency band is worse than a threshold value. As a result, when the D2D frequency band indicated by the D2D resource notification may cause interference, it is possible to ensure that the D2D frequency band is not used for the D2D communication.

Alternatively, the available condition may be that a permission to use the D2D frequency band is obtained from the eNB 200-1. In this case, the UE 100 transmits a report on the measurement result about the D2D frequency band, to the eNB 200-1. The eNB 200-1 determines on the basis of the report whether or not a permission to use the D2D frequency band is applied to the UE 100. As a result, when the D2D frequency band indicated by the D2D resource notification may cause interference, it is possible to ensure that the D2D frequency band is not used for the D2D communication.

The D2D resource notification (D2D resource information) may include information I8 for designating a synchronization target that is to be used as a reference (hereinafter, "D2D synchronization reference") of a time synchronization and/or a frequency synchronization in a process for the D2D communication. The process for the D2D communication includes a Discovery process, a D2D transmission process, and a D2D reception process, for example. The information I8 includes information indicating a frequency band that is to be used as the D2D synchronization reference, or a cell identifier of a cell that is to be used as the D2D synchronization reference, for example. The UE 100 uses the designated synchronization target (the frequency band or the cell) as the D2D synchronization reference. As a result, when a plurality of UEs 100 receive the D2D resource notifications from different cells, if the D2D resource notification is configured such that each of the D2D frequency band and the D2D synchronization reference is unified, then it becomes possible to perform the D2D communication of the Inter-cell by the plurality of UEs 100.

However, the information I8 may not be necessarily included in the D2D resource notification. In this case, the UE 100 uses a transmission source (the frequency band or the cell) of the D2D resource notification as the D2D synchronization reference.

Summary of First Embodiment

As described above, the communication control method according to the first embodiment comprises: a transmission step of transmitting, by the eNB 200-1 configured to use a predetermined frequency band for cellular communication, at least one D2D resource notification in the predetermined frequency band; and a reception step of receiving, by the UE 100, the D2D resource notification transmitted in the predetermined frequency band. The D2D resource notification includes the information indicating the D2D frequency band that is a frequency band available for the D2D communication. As a result, the frequency band different from t the predetermined frequency can be made available to use for the D2D communication. Thus, it becomes possible to perform the D2D communication without reducing the radio resources available for the cellular communication.

Modification of First Embodiment

The D2D resource notification may include at least one item of the following information in addition to the above-described information.

Configuration of the Discovery Subframe

The Discovery subframe is a subframe used for the Discovery process. The Configuration of the Discovery subframe is a list of system frame numbers and subframe numbers used for the Discovery process, for example. Alternatively, the Configuration of the Discovery subframe may be a cycle and a period in which the Discovery subframe is arranged.

Configuration of Discovery Signal

The Discovery signal is a radio signal for the Discovery process transmitted and received in the Discovery process. The Configuration of the Discovery signal is the number of resource blocks used for transmitting the Discovery signal, and a parameter for determining a hopping pattern in time/frequency/power directions, for example.

Configuration of Resource Block for D2D Control Channel

The D2D control channel is a control channel between the UEs. The Configuration of a resource block for the D2D control channel is a resource block number corresponding to the D2D control channel, for example.

Method of Controlling to Transmit Discovery Signal

A method of controlling to transmit the Discovery signal is either one of a full control by a network or a cluster head, or CSMA.

Method of Controlling to Transmit Communication Signal

The Communication signal is a radio signal transmitted and received in the D2D communication, and mainly is a user data signal. A method of controlling to transmit the Communication signal is either one of a full control by a network or a cluster head, or CSMA.

Second Embodiment

Next, the second embodiment will be described. Description proceeds with a focus on a difference from the above-described first embodiment, and the configuration similar to that of the first embodiment will not be described.

In the first embodiment, by using, for the D2D communication, the frequency band different from a predetermined frequency band used for the cellular communication, the D2D communication is enabled without reducing the radio resources available for the cellular communication. In the second embodiment, by using, for the D2D communication, a frequency band in another PLMN (Public Land Mobile Network), the D2D communication is enabled without reducing the radio resources available for the cellular communication.

Further, a case is assumed where the UE 100-1 and the UE 100-2 exist in different cells. In this case, there is a possibility that between a cell in which the UE 100-1 exists (first cell) and a cell in which the UE 100-2 exists (second cell), a time-frequency resource (D2D radio resource) available for a D2D proximity service (for example, a D2D discovery procedure and D2D communication) differ. As a result, it is not possible to start the D2D communication between the UEs existing in the different cells, and it may thus not be possible to use the D2D proximity service.

Therefore, in the second embodiment, an operation for enabling use of the D2D proximity service between the UEs existing in the different cells will also be described.

(Operation According to Second Embodiment)

Hereinafter, an operation according to the second embodiment will be described. FIG. 10 is a diagram showing an operation environment according to the second embodiment.

As shown in FIG. 10, an eNB 200 #1 is included in a PLMN #1 that is an LTE network of a network operator #1. Therefore, the eNB #1 belongs to the PLMN #1. To the PLMN #1, a frequency band #1 (Freq. #1) is assigned. The eNB 200 #1 manages a cell #1 of the frequency band #1. The cell #1 belongs to the frequency band #1 and belongs to the PLMN #1.

A UE 100 #1 exists in the cell #1, and registers its location in the PLMN #1. That is, the UE 100 #1 belongs to the PLMN #1. For example, the UE 100 #1 is in an RRC idle state in the cell #1. Alternatively, the UE 100 #1 may be in an RRC connected state in the cell #1.

An eNB 200 #2 is included in a PLMN #2 that is an LTE network of a network operator #2. Therefore, the eNB #2 belongs to the PLMN #2. To the PLMN #2, a frequency band #2 (Freq. #2) is assigned. The eNB 200 #2 manages a cell #2 of the frequency band #2. The cell #2 belongs to the frequency band #2 and belongs to the PLMN #2. The cell #2 is a cell different from the cell #1. In the present embodiment, the cell #2 is located adjacent to the cell #1. The cell #2 may be neighbor, overlap, and be away from the cell #1. The eNB 200 #2 is synchronized with the eNB 200 #1. Alternatively, the eNB 200 #2 may also be asynchronized with the eNB 200 #1.

The UE 100 #2 exists in the cell #2, and registers its location in the PLMN #2. That is, the UE 100 #2 belongs to the PLMN #2. The UE 100 #2 is in an RRC idle state in the cell #2. Alternatively, the UE 100 #2 may be in an RRC connected state in the cell #2.

In such an operation environment, a case is assumed where the above-described D2D proximity service is applied to the UE 100 #1 and the UE 100 #2 (that is, a case where the UE 100 #1 and the UE 100 #2 use the D2D proximity service).

In such a case, the UE 100 #1 receives first D2D resource information (for example, the Discovery resource information and the Communication resource information) from the eNB 200 #1. The first D2D resource information is information on the D2D radio resource available for the D2D proximity service in the cell #1. Specifically, each item of the Discovery resource information and the Communication resource information transmitted by the eNB 200 #1 indicates a radio resource included in the frequency band #1. The (first) D2D resource information will be described in detail later.

The UE 100 #2 receives second D2D resource information (for example, the Discovery resource information and the Communication resource information) from the eNB 200 #2. The second D2D resource information is information on the D2D radio resource available for the D2D proximity service in the cell #2. Specifically, each item of the Discovery resource information and the Communication resource information transmitted by the eNB 200 #2 indicates a radio resource included in the frequency band #2.

The frequency band #1 used by the UE 100 #1 for the D2D discovery procedure/the D2D communication may not match the frequency band #2 used by the UE 100 #2 for the D2D discovery procedure/the D2D communication, and thus, the D2D communication may not be started by the UE 100 #1 and the UE 100 #2 belonging to different PLMNs.

Therefore, in the embodiment, the following operation enables starting the D2D communication between user terminals belonging to the different PLMNs.

(A) First Operation

Figure 11:
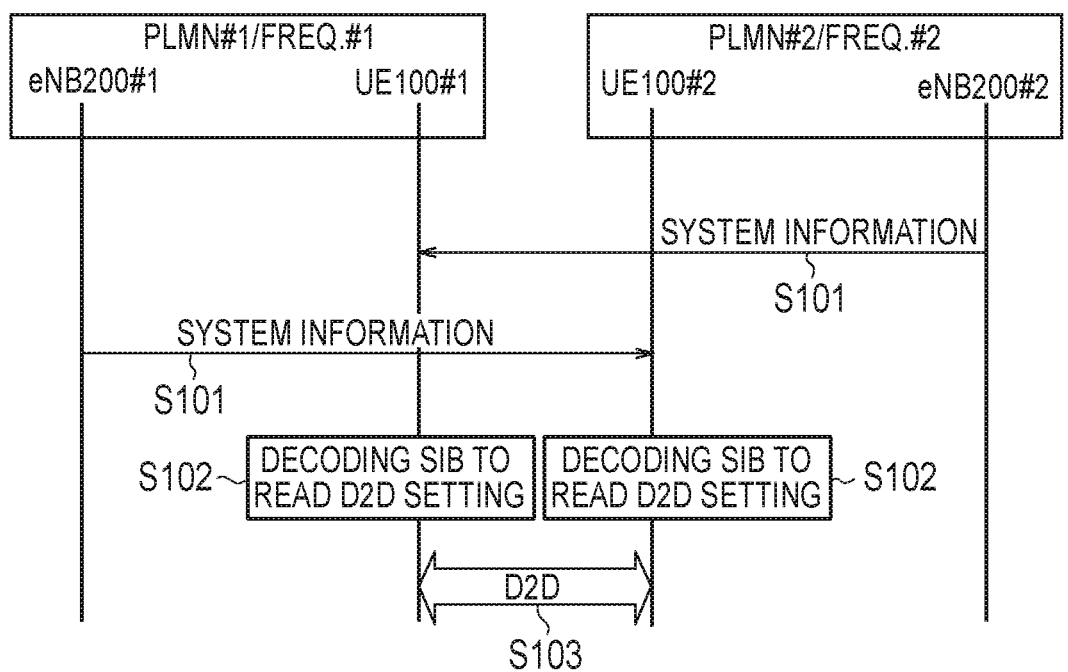
FIG. 11 is a sequence chart for describing a first operation according to the embodiment.

A first operation will be described using FIG. 11. FIG. 11 is a sequence chart for describing the first operation according to the embodiment.

It is noted that description proceeds below with an assumption that the UE 100 #1 exists at a location where it is possible to receive a radio signal from the eNB 200 #2 (cell #2) and the UE 100 #2 exists at a location where it is possible to receive a radio signal from the eNB 200 #1 (cell #1).

As shown in FIG. 11, in step S101, the eNB 200 #1 transmits, by broadcast, a system information block (SIB) including the first D2D resource information, into the cell #1. That is, the eNB 200 #1 uses the radio resource in the frequency band #1 to transmit, by broadcast, the SIB including the first D2D resource information. Likewise, the eNB 200 #2 uses the radio resource in the frequency band #2 to transmit, by broadcast, the SIB including the second D2D resource information, into the cell #2. The SIBs correspond to a D2D resource notification.

The UE 100 #1 scans the frequency band different from the frequency band #1 operated in the PLMN #1 to which the cell #1 belongs. Specifically, the UE 100 #1 performs a cell search in the frequency band #2. The UE 100 #1 discovers the cell #2 of the frequency band #2 by the cell search, and receives the SIB from the cell #2 (eNB 200 #2). On the other hand, similarly to the UE 100 #1, the UE 100 #2 discovers the cell #1 of the frequency band #1 by the cell search, and receives the SIB from the cell #1 (eNB 200 #1).

In step S102, the UE 100 #1 decodes the SIB to decode the second D2D resource information and reads a content of the second D2D resource information. As a result, the UE 100 #1 receives (obtains) the second D2D resource information. For example, the UE 100 #1 comprehends whether the D2D proximity service (D2D communication) is permitted in the cell #2 (frequency band #2). Therefore, the UE 100 #1 intercepts the radio signal including the D2D resource information in another PLMN. On the other hand, similarly to the UE 100 #1, the UE 100 #2 reads the first D2D resource information. As a result, the UE 100 #2 receives (obtains) the first D2D resource information.

In step S103, each of the UE 100 #1 and the UE 100 #2 performs the D2D communication on the basis of the first D2D resource information and the second D2D resource information.

For example, the UE 100 #1 uses the frequency band #1 permitted in use in the PLMN #1 to transmit the D2D discovery signal. The UE 100 #2 receives the D2D discovery signal transmitted by using the frequency band #1, on the basis of the first D2D resource information. As a result, the UE 100 #2 discovers the UE 100 #1. On the other hand, the UE 100 #2 uses the frequency band #2 permitted in use in the PLMN #2 to transmit the D2D discovery signal (or a response to the D2D discovery signal from the UE 100 #1). The UE 100 #1 receives the D2D discovery signal from the UE 100 #2, on the basis of the second D2D resource information. As a result, the UE 100 #1 and the UE 100 #2 are capable of discovering a partner terminal that may be a communication partner of the D2D communication.

The UE 100 #1 and the UE 100 #2 that has discovered the partner terminal are capable of performing the D2D communication by an operation similar to the above-mentioned D2D discovery signal. As a result, the UE 100 #1 and the UE 100 #2 are capable of performing the D2D communication in a frequency band permitted each in the PLMNs of the UE 100 #1 and the UE 100 #2.

In accordance with the first operation, each UE 100 is capable of obtaining the D2D resource information in a different PLMN, and thus, each UE 100 is capable of starting the D2D communication between the user terminals belonging to the different PLMNs.

(B) Second Operation

Figure 12:
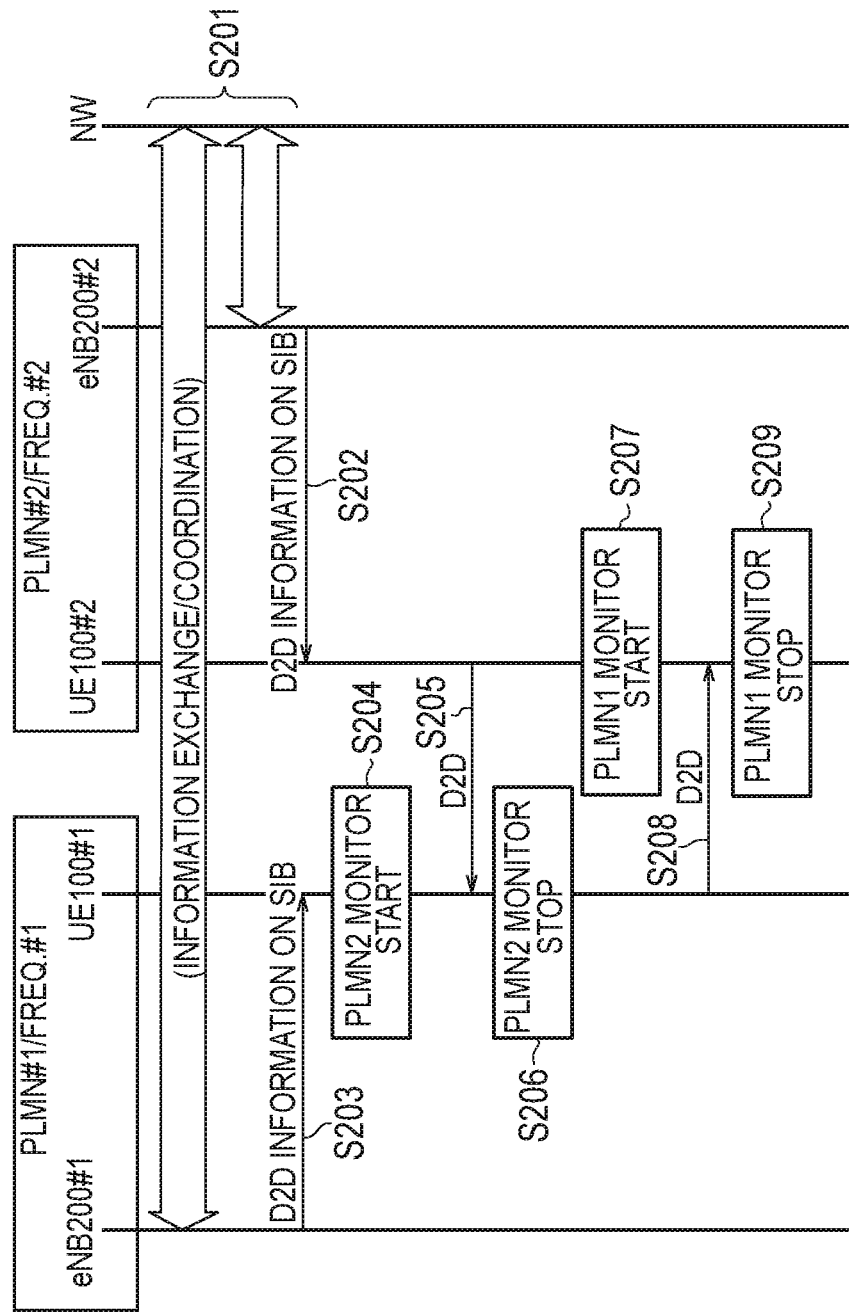
FIG. 12 is a sequence chart for describing a second operation according to the embodiment.

Next, a second operation will be described using FIG. 12. FIG. 12 is a sequence chart for describing the second operation according to the embodiment.

In the first operation, the UE 100 receives the D2D resource information in another cell (another PLMN) from another eNB 200 (another cell) belonging to the other PLMN. In the second operation, the UE 100 receives the D2D resource information in another cell, from a cell in which the UE 100 exist.

As shown in FIG. 12, in step S201, the eNB 200 #1 transmits (notifies of) the first D2D resource information to the eNB 200 #2 via NW (network). Further, the eNB 200 #1 receives, via the NW, the second D2D resource information from the eNB 200 #2. As a result, the eNB 200 #1 and the eNB 200 #2 exchange and share the respective D2D resource information. The eNB 200 #1 is capable of changing the configuration of the D2D resource of the eNB 200 #1 (that is, the first D2D resource information), on the basis of the second D2D resource information. The eNB 200 #2 is, similarly to the eNB 200 #1, capable of changing configuration of the D2D resource (that is, the second D2D resource information), on the basis of the first D2D resource information. Thus, the eNB 200 #1 and the eNB 200 #2 cooperate on the D2D resource.

It is noted that the first D2D resource information includes frequency resource information on the frequency band #1 available for the D2D proximity service in the cell #1. Likewise, the second D2D resource information includes frequency resource information on the frequency band #2 available for the D2D proximity service in the cell #2.

Further, when the eNB 200 #1 holds an Inter-PLMN list regarding the D2D resource information in another PLMN, the eNB 200 #1 may update the Inter-PLMN list, on the basis of the second D2D resource information from the eNB 200 #2. That is, the eNB 200 #1 may update the information on the frequency band #2 available for the D2D proximity service in the cell #2, held by the eNB 200 #1, on the basis of the second D2D resource information. The same is true of the eNB 200 #2.

In step S202, the eNB 200 #2 transmits, by broadcast, the SIB including the first D2D resource information, into the cell #2. The UE 100 #2 receives the first D2D resource information. It is noted that the eNB 200 #2 may transmit the SIB including the second D2D resource information, in addition to the first D2D resource information.

In step S203, the eNB 200 #1 transmits the SIB including the second D2D resource information, similarly to step S202. The UE 100 #1 receives the second D2D resource information.

In step S204, the UE 100 #1 starts monitoring the frequency band (frequency band #2) of the D2D resource available for the PLMN #2, on the basis of the second D2D resource information received from the eNB 200 #1. Specifically, the UE 100 #1 starts scanning the frequency band #2.

In step S205, the UE 100 #2 transmits the D2D radio signal, on the basis of the second D2D resource information. Specifically, the UE 100 #2 uses the D2D resource of the frequency band #2 to transmit the D2D radio signal. The UE 100 #1 that monitors the frequency band #2 receives the D2D radio signal from the UE 100 #2.

In step S206, the UE 100 #1 ends monitoring. When a predetermined period passes since starting monitoring or when a predetermined time reaches, the UE 100 #1 may end monitoring. When reception of the D2D radio signal is used as a trigger, the UE 100 #1 may end monitoring.

In step S207, the UE 100 #2 starts monitoring the frequency band (frequency band #1) of the D2D resource available for the PLMN #1, on the basis of the first D2D resource information received from the eNB 200 #2.

In step S208, the UE 100 #1 transmits the D2D radio signal, on the basis of the first D2D resource information. Specifically, the UE 100 #1 uses the D2D resource of the frequency band #1 to transmit the D2D radio signal. The D2D radio signal may be a response signal to the D2D radio signal from the UE 100 #2.

The UE 100 #2 that monitors the frequency band #1 receives the D2D radio signal from the UE 100 #1.

In step S209, the UE 100 #2 ends monitoring, similarly to step S206.

Each of the UE 100 #1 and the UE 100 #2 is capable of using the D2D proximity service, on the basis of the received D2D radio signal.

In accordance with the second operation, even when the UE 100 is not capable of scanning only the frequency band in the PLMN of the UE 100, the UE 100 is capable of acquiring the D2D resource information in a different PLMN. As a result, it becomes possible to start the D2D communication between the user terminals belonging to the different PLMNs.

(C) First Modification of Second Operation

Figure 13:
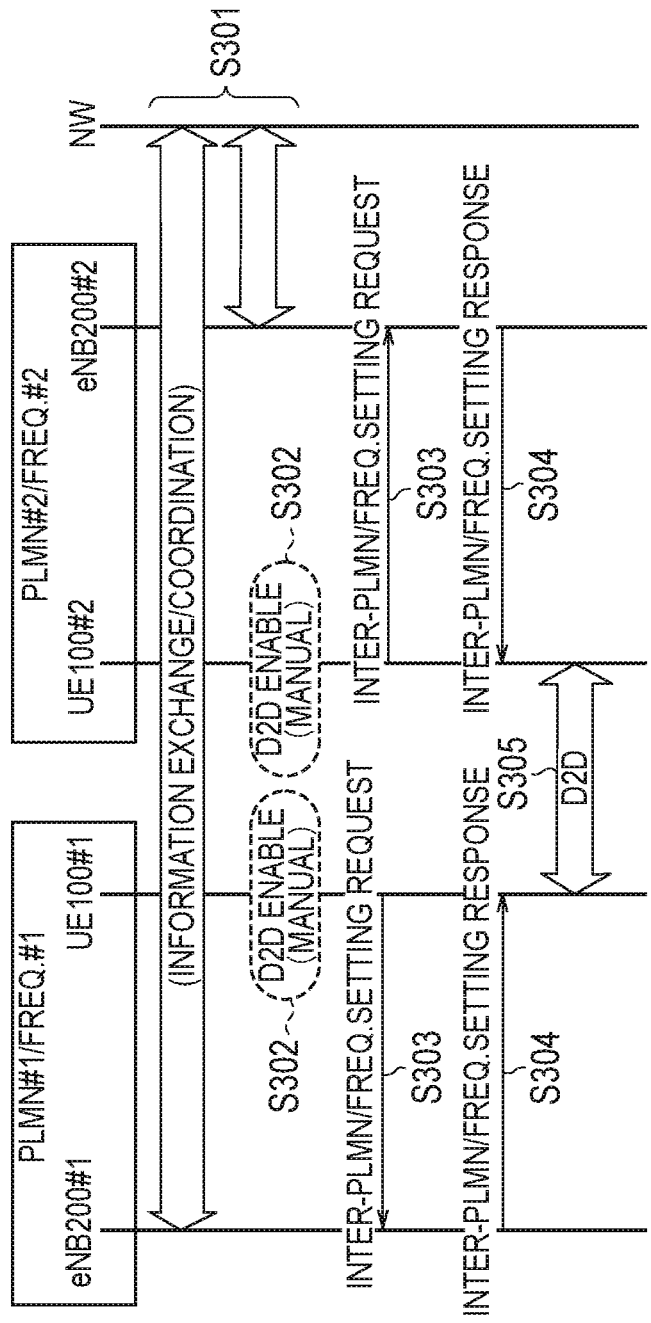
FIG. 13 is a sequence chart for describing a first modification of the second operation according to the embodiment.

Next, a first modification of the second operation will be described by using FIG. 13. FIG. 13 is a sequence chart for describing the first modification of the second operation according to the second embodiment.

In the second operation, the eNB 200 voluntarily transmits the D2D resource information in another PLMN, to the UE 100. In the first modification of the second operation example, the D2D resource information is transmitted in response to a request from the UE 100.

As shown in FIG. 13, step S301 corresponds to step S201.

In step S302, the UE 100 #1 becomes capable of using the D2D proximity service. Specifically, the UE 100 #1 becomes capable of using the D2D proximity service by manual input from a user. Alternatively, when the UE 100 #1 receives a permission signal for the D2D proximity service from a management server for the D2D proximity service, the UE 100 #1 may become capable of using the D2D proximity service.

Alternatively, the UE 100 #1 capable of using the D2D proximity service in the PLMN #1 may be capable of using the D2D proximity service between the different PLMNs.

The UE 100 #2 becomes capable of using the D2D proximity service, similarly to the UE 100 #1.

In step S303, the UE 100 #1 transmits an Inter-PLMN/Freq. setting request that is a request for the D2D resource information different from the first D2D resource information, to the eNB 200 #1. When the UE 100 #1 uses the D2D proximity service, the UE 100 #1 may transmit the Inter-PLMN/Freq. setting request. The UE 100 #2 requests the D2D resource information different from the second D2D resource information, similarly to the UE 100 #1.

In step S304, the eNB 200 #1 transmits a response (Inter-PLMN/Freq. setting response) to the request from the UE 100 #1, to the UE 100 #1. The response includes the second D2D resource information. Specifically, the response includes the information indicating the frequency bands (specifically, the frequency band #2) available for the D2D proximity service in the different PLMNs. Alternatively, the response includes the information indicating the frequency bands available for the D2D proximity service in different cells.

The eNB 200 #2 transmits the response to the request from the UE 100 #1, to the UE 100 #2, similarly to the eNB 200 #1. The response includes the first D2D resource information.

Step S305 corresponds to step S103.

In accordance with the first modification of the second operation, the UE 100 is capable of making a request when the D2D resource information in another PLMN is needed. For example, the UE 100 is capable of making the request when there is no partner terminal of the D2D proximity service in the PLMN of the UE 100.

(D) Second Modification of Second Operation

Figure 14:
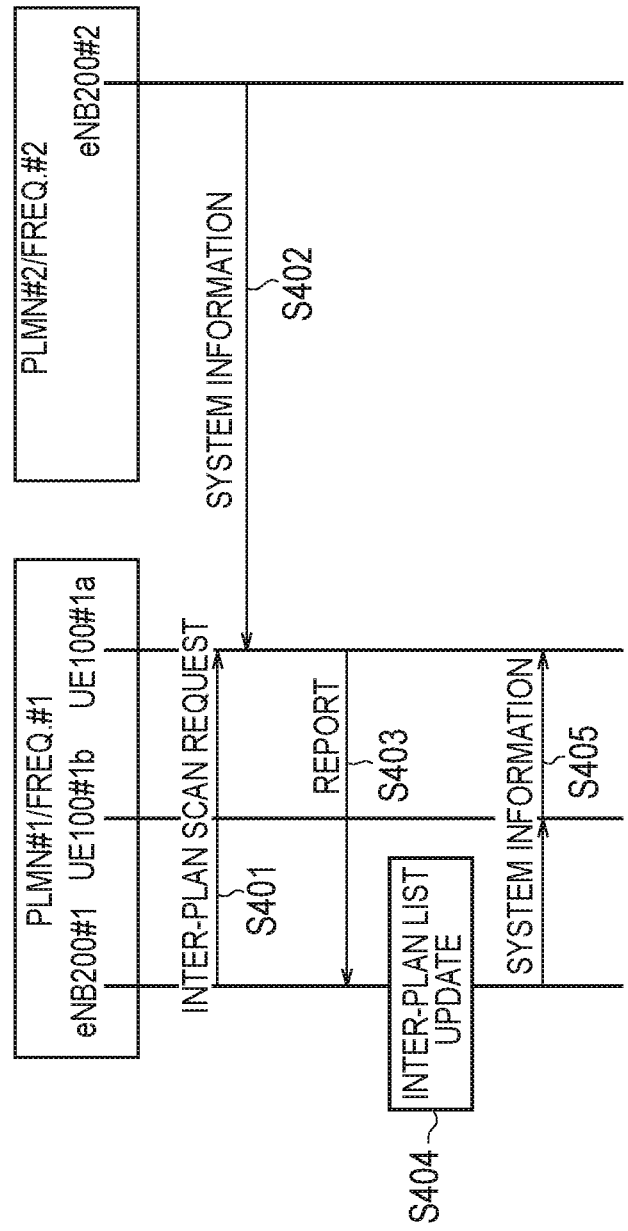
FIG. 14 is a sequence chart for describing a second modification of the second operation according to the embodiment.

Next, a second modification of the second operation will be described by using FIG. 14. FIG. 14 is a sequence chart for describing the second modification of the second operation according to the embodiment.

In the second operation, the eNB 200 (for example, the eNB 200 #1) receives the D2D resource information (for example, the second D2D resource information) in another PLMN, from another eNB 200 (for example, the eNB 200 #2). In the second modification in the second operation example, the eNB 200 receives the D2D resource information in another PLMN, from the UE 100.

As shown in FIG. 14, in step S401, the eNB 200 #1 transmits a request (Inter-PLMN/Freq. scan request) for scanning the frequency band available in a different PLMN (frequency), to a UE 100 #1a. The request may include information on a frequency band which is requested to be scanned (for example, the frequency band #2).

The UE 100 #1a starts the scanning, in response to receipt of the request from the eNB 200 #1. The UE 100 #1a may scan the frequency band based on information on the frequency band included in the request, and may scan the frequency band different from the frequency band #1.

Step S402 corresponds to step S101. Specifically, the UE 100 #1a receives the second D2D resource information (D2D resource notification) from the eNB 200 #2.

In step S403, the UE 100 #1a transmits (reports) the second D2D resource information received from the eNB 200 #2, to the eNB 200 #1. The eNB 200 #1 receives the second D2D resource information from the UE 100 #1a.

In step S404, the eNB 200 #1 updates the second D2D resource information held by the eNB 200 #1, on the basis of the second D2D resource information received from the UE 100 #1a. For example, the eNB 200 #1 updates the Inter-PLMN list. When there is no second D2D resource information in the eNB 200 #1, the eNB 200 #1 registers the second D2D resource information on the Inter-PLMN list.

In step S405, the eNB 200 #1 broadcasts the SIB including the updated second resource information, into the cell #1. Each of the UE 100 #1a and the UE 100 #1b receives the updated second resource information.

In accordance with the second modification of the second operation, the eNB 200 #1 is capable of acquiring the second D2D resource information even when the eNB 200 #1 does not receive (is not capable of receiving) the second D2D resource information from the eNB 200 #2.

(E) Third Modification of Second Operation

Figure 15:
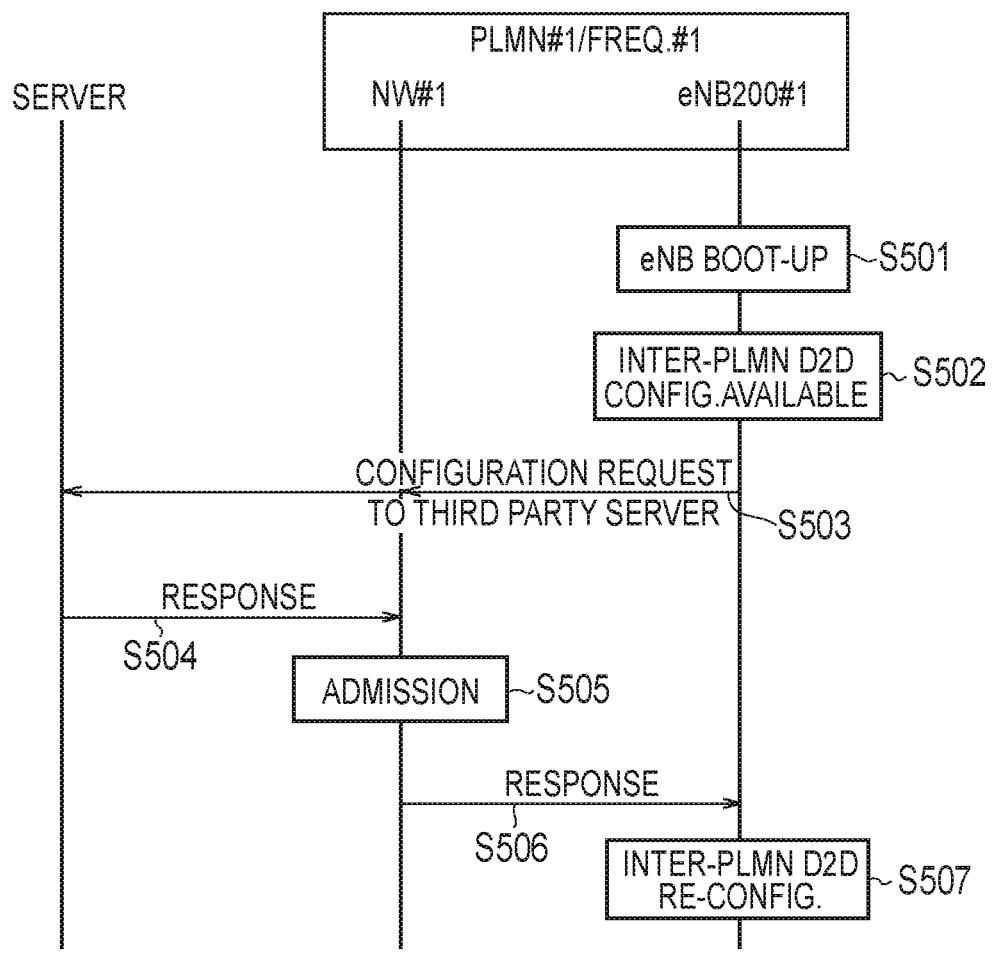
FIG. 15 is a sequence chart for describing a third modification of the second operation according to the embodiment.

Next, a third modification of the second operation will be described by using FIG. 15. FIG. 15 is a sequence chart for describing the third modification of the second operation according to the embodiment.

In the second modification of the second operation, the eNB 200 receives the D2D resource information in another PLMN, from the UE 100. On the other hand, in the third modification of the second operation example, there is a management server that manages D2D resources in a plurality of PLMNs and the eNB 200 receives the D2D resource information in another PLMN, from the management server.

As shown in FIG. 15, in step S501, the eNB 200 #1 boots up.

In step S502, the eNB 200 #1 determines that a configuration of the D2D proximity service between the different PLMNs is available.

In step S503, the eNB 200 #1 transmits a configuration request (Configuration request) for using the D2D proximity service between the different PLMNs, via NW #1, to the management server (Server).

The management server manages the D2D resource in the plurality of PLMNs. The management server may be a third party server independent from the plurality of PLMNs. For example, the management server manages a frequency band available in each of the plurality of PLMNs.

In step S504, the management server transmits a response (Response) to the configuration request from the eNB 200 #1, to NW1 (a network, specifically, an entity of the EPC 20 belonging to the PLMN 1) belonging to the PLMN 1. The response includes the configuration information for using the D2D proximity service between the different PLMNs in the eNB 200 #1 (cell #1). For example, the configuration information includes the information on a frequency band available for the D2D proximity service between the different PLMNs, in the eNB 200 #1. Further, the configuration information may include the D2D resource information (that is, the second D2D resource information) in the eNB (eNB 200 #2) adjacent to the eNB 200 #1.

In step S505, the NW #1 determines whether or not to admit (the configuration information included in) the response from the management server. Specifically, the NW #1 determines, on the basis of the configuration information, whether or not the configuration of the D2D resource can be admitted (used) in the PLMN #1.

It is noted that when the response from the management server is not admitted, the NW #1 may notify the management server of not admitting the response. The management server may transmit, on the basis of the notification from the NW #1, a response including new configuration information, to the NW #1.

In step S506, when the NW #1 admits the response from the management server, the NW #1 transmits the response to the eNB 200 #1.

In step S507, the eNB 200 #1 performs configuration for using the D2D proximity service between the different PLMNs, on the basis of the configuration information including in the response. The eNB 200 #1 may create the Inter-PLMN list on the basis of the configuration information, when the D2D resource information in another PLMN is included in the configuration information.

Further, even when the D2D resource information in another PLMN is not included in the configuration information, the eNB 200 #1 can acquire the D2D resource information in the other PLMN by inquiring of the eNB 200 #1.

Further, when the eNB 200 #1 wishes to change the configuration, the eNB 200 #1 may transmit the configuration request to the management server, similarly to step S503. The eNB 200 #1 performs reconfiguring (configuration change) for using the D2D proximity service between the different PLMNs, on the basis of the response from the management server.

In this case, the eNB 200 #1 can acquire the latest D2D resource information in another PLMN by inquiring of the management server to.

In accordance with the third modification of the second operation, the eNB 200 is capable of collectively acquiring the D2D resource information in the plurality of PLMNs without acquiring the D2D resource information from each of the plurality of PLMNs. Further, when the management server is a third party server, it becomes unnecessary to transmit the information to another PLMN, and thus, it is possible to avoid the information leakage.

(D2D Resource Information)

Next, the D2D resource information will be described. It is possible to transmit the D2D resource information as a D2D resource notification.

The D2D resource information is information on the radio resource available/in use for the D2D proximity service. The D2D resource information includes the resource information indicating a D2D resource available/in use in the cell. Alternatively, the D2D resource information includes the resource information indicating a D2D resource available/in use in the PLMN to which the cell belongs. The resource information is parameter information indicating arrangement of the D2D resources.

The resource information includes frequency resource information on the frequency (frequency band) of the D2D resource. The frequency resource information includes information indicating a center frequency of the frequency band of the D2D resource, and information indicating a bandwidth of the frequency band of the D2D resource. The frequency resource information may be information indicating an operation band of the D2D resource available in the eNB 200 (cell). Further, the frequency resource information may include a resource block number within the operation band.

Further, the resource information includes time resource information on a time of the D2D resource. The time resource information is at least one of: a system frame number, a subframe number, a start/end subframe, and a transmission period.

The D2D configuration information may include information indicating types of D2D resources (transmission candidate resources/reception candidate resources). It is noted that the transmission candidate resource may be a transmission resource pool (Tx resource pool) reserved as a resource for transmission, or may be a resource assigned for transmission. The reception candidate resource may be a reception resource pool (Rx resource pool) reserved as a resource for reception, or may be a resource assigned for reception.

The D2D resource information may include a PLMN identifier. The UE 100 #1 is capable of inquiring, on the basis of the PLMN identifier of the PLMN #2, a server, etc., managed by the PLMN #2, via the eNB 200 #1, about the UE 100 #2 that transmits the D2D radio signal.

The D2D resource information may include information indicating a Modulation and Coding Scheme (MCS) applied to the D2D radio signal. This information is necessary when the MCS applied to the D2D radio signal is variable. For example, the eNB 200 #1 is capable of informing the UE 100 #1 of the MCS applied to the D2D radio signal from the UE 100 #2. The information corresponds to information for interpreting a transmission content of the D2D radio signal.

The D2D resource information may include information indicating the number of times of re-transmissions of the D2D radio signal. The eNB 200 #1 is capable of informing the UE 100 #1 of the number of times of re-transmissions of the D2D radio signal from the UE 100 #2.

The D2D resource information may include information indicating an encryption setting (encryption key and integrity algorithm) applied to the D2D radio signal. The information is necessary when the D2D radio signal is encrypted. The eNB 200 #1 is capable of informing the UE 100 #1 of the encryption setting applied to the D2D radio signal from the UE 100 #2. The information corresponds to information for interpreting a transmission content of the D2D radio signal.

The D2D resource information may include an identifier of a message format applied to the D2D radio signal. The identifier is information necessary for interpreting (the transmission content of) the D2D radio signal when a variable CP length, a variable message/control bit number, etc., are applied to the D2D communication. The eNB 200 #1 is capable of informing the UE 100 #1 of the identifier of the message format applied to the D2D radio signal from the UE 100 #2.

The D2D resource information may include information indicating whether or not the D2D resource is used commonly with the resource in the cellular communication. When the D2D resource is used commonly with the resource in the cellular communication, interference to the cellular communication/interference from the cellular communication is generated, and thus, the eNB 200 is capable of using the information to perform transmission power control.

The D2D resource information may include information on synchronization between the PLMNs. Specifically, the information is flag information indicating whether or not the PLMN #1 and the PLMN #2 are synchronized. The information may indicate a synchronization flag indicating synchronization between PLMNs or may be an asynchronization flag indicating asynchronization between PLMNs. Likewise, the D2D resource information may include information on synchronization between the cells. The information is flag information indicating whether or not the cell #1 and the cell #2 are synchronized. When the PLMN #1 and the PLMN #2 are not synchronized, or when the cell #1 and the cell #2 are not synchronized, the UE 100 #1 transmits and receives the D2D radio signal after the synchronization with the cell #2. As a result, the UE 100 #1 becomes capable of receiving the D2D radio signal from the UE 100 #2, and the UE 100 #2 becomes capable of receiving the D2D radio signal from the UE 100 #1.

Summary of Second Embodiment

As described above, on the basis of the communication control method according to the second embodiment, the information indicating the D2D frequency band included in the D2D resource notification (D2D resource information) indicates a frequency band available in another PLMN. As a result, the UE 100 is capable of using the D2D proximity service by using the frequency band available in another PLMN even when the eNB 200 does not reserve the D2D radio resource available for the D2D proximity service, out of the frequency band to which the cell of the eNB 200 belongs. Therefore, it is possible to enable use of the D2D proximity service without reducing the radio resources available for the cellular communication.

Further, the UE 100 is capable of acquiring the D2D resource information in a different PLMN, and thus, the UE 100 becomes capable of using the D2D proximity service between the user terminals belonging to the different PLMNs.

Other Embodiments

In the above-described first embodiment, the eNB 200-1 transmits the D2D resource notification in which the frequency band different from the 800-MHz band is designated as the D2D frequency band, in the 800-MHz band. Further, the eNB 200-1 may transmit the D2D resource notification in which the frequency band different from the 2-GHz band is designated as the D2D frequency band, in the 2-GHz band. Likewise, the eNB 200-2 may transmit the D2D resource notification in which the frequency band different from the 1.7-GHz band is designated as the D2D frequency band, in the 1.7-GHz band. The eNB 200-3 may transmit the D2D resource notification in which the frequency band different from the 3.5-GHz band is designated as the D2D frequency band, in the 3.5-GHz band.

Further, in the above-described first embodiment, one example where a frequency band having a wide bandwidth such as the 800-MHz band, the 1.7-GHz band, the 2-GHz band, and the 3.5-GHz band is handled is described. However, the first embodiment may also be configured to handle a subdivided frequency band rather than such a frequency band. For example, the eNB 200 that uses an 800-820 MHz band out of the 800-MHz band may transmit a D2D resource notification in which an 820-840 MHz band different from the 800-820 MHz band is designated as the D2D frequency band, in the 800-820 MHz band. Thus, it may suffice to designate a frequency band different from the frequency band used for transmitting the D2D resource notification as the D2D frequency band, irrespective of the bandwidth of the frequency band.

Further, in the above-described first embodiment, control performed by the eNB 200 on the D2D frequency band is not particularly described; however, the following control may be possible: Specifically, when the frequency band different from the frequency band used for transmitting the D2D resource notification is designated as the D2D frequency band and when the D2D frequency band corresponds to a cellular uplink frequency band, the eNB 200 may change the number of PUCCH resource blocks in the D2D frequency band (uplink frequency band), to zero.

In the above-described first embodiment, the D2D frequency band is set from among the operator bands (for example, the 800-MHz band, the 1.7-GHz band, the 2-GHz band, and the 3.5-GHz band). However, a frequency band other than the operator bands (for example, an IMS band) may be set as the D2D frequency band.

In the above-described first embodiment, in the In coverage case, the D2D frequency band is designated by the eNB 200. However, for example, when the Out of coverage case (or the Partial Coverage case) is assumed, the control UE may designate the D2D frequency band. The control UE serves as a reference for synchronization in a cluster, and is the UE that controls the D2D communication in the cluster. In the following, such a control UE is referred to as a "cluster head".

FIG. 9 is a diagram for describing an operation according to another embodiment. As shown in FIG. 9, a plurality of clusters are formed which use respectively different frequency bands for the D2D communication. In each cluster, the cluster head (CHUE) exists. The cluster that uses the 800-MHz band for the D2D communication includes CHUE 100-X and other UE 100-1 and UE 100-2. In such an operation environment, the CHUE 100-X transmits, to the UE 100-1 and the UE 100-2, the D2D resource notification in which a frequency band different from the 800-MHz band is designated as the D2D frequency band, in the 800-MHz band. In this case, the CHUE 100-X corresponds to a communication apparatus according to the present disclosure. That is, when the eNB 200-1 is replaced with the CHUE 100-X in the operation according to the above-described embodiment, it is possible to apply the operation according to the above-described embodiment to the operation environment shown in FIG. 9.

In the above-described first embodiment, the D2D resource notification transmitted to the UE 100 is described; however, so that information such as the D2D frequency band is shared among the eNBs 200, the D2D resource notification may be transmitted and received among the eNBs 200. Further, when the D2D frequency band, etc., are determined by the EPC 20, the D2D resource notification may be transmitted from the EPC 20 to the eNB 200. Further, in the operation environment as shown in FIG. 9, the D2D resource notification may be transmit and receive among the cluster heads so as to share information such as the D2D frequency band among the cluster heads.

In the above-described first embodiment, an example of the D2D communication (Communication) is described; however, this is not limiting. The D2D resource notification may include, as the information indicating the D2D frequency band available in the D2D proximity service, information indicating the frequency band available for transmitting/receiving the D2D radio signal transmitted in the D2D proximity service. Specifically, the D2D frequency band is a frequency band available for transmission and reception of at least one of: a D2D discovery signal transmitted in a D2D discovery procedure; a D2D communication signal transmitted in a D2D communication; a D2D synchronization signal transmitted in a D2D synchronization procedure, and a control signal including information (Scheduling Assignment (SA)) indicating a location of a radio resource used for transmitting user data in the D2D communication.

In the above-described first embodiment, description proceeds with a case where the transmission power control parameter is a parameter applied to the D2D communication; however, a parameter applied in the D2D proximity service may suffice. For example, the parameter may be a parameter applied in the D2D discovery procedure (or the D2D synchronization procedure).

In the above-described first embodiment, description proceeds with a case where the information indicating the use case is the information indicating the use case where the D2D frequency band is used for the D2D communication; however, information indicating a use case where the D2D frequency band is used in the D2D proximity service may suffice. For example, the information indicating the use case may be information indicating a use case used for the D2D discovery procedure (or the D2D synchronization procedure).

In the above-described first embodiment, the UE 100 determines whether or not the D2D frequency band is available for the D2D communication on the basis of the information indicating the available condition; however, the UE 100 may determine whether or not the D2D frequency band is available for the D2D proximity service on the basis of the information indicating the available condition. For example, the UE 100 may determine whether or not the D2D frequency band is available for the D2D discovery procedure (or the D2D synchronization procedure), on the basis of the information indicating the available condition.

In the above-described first and second embodiments, a case is not particularly described where the frequency resource available/in use in the D2D proximity service changes (hops) in time. However, the frequency resource available/in use in the D2D proximity service may change (hop) in time. In this case, the above-described resource information may be configured to show a pattern of the hopping (hopping pattern).

In the first operation according to the above-described second embodiment, each of the UE 100 #1 belonging to the PLMN #1 and the UE 100 #2 belonging to the PLMN #2 receives the D2D resource information in the other cell, from the cell belonging to the other PLMN; however, this is not limiting. The one UE 100 may receive the D2D resource information in the other cell. For example, when the UE 100 #1 receives the second D2D resource information from the cell #2 (eNB 200 #2), the UE 100 #1 may receive the D2D discovery signal from the UE 100 #2, may transmit the D2D discovery signal to the UE 100 #2, and may perform the D2D communication with the UE 100 #2, on the basis of the second D2D resource information.

In the second modification of the second operation according to the above-described second embodiment, the eNB 200 #1 broadcasts the SIB including the second resource information, into the cell #1, on the basis of the second D2D resource information received from the UE 100 #1*a*; however, this is not limiting. The eNB 200 #1 may broadcast, on the basis of the second D2D resource information received from the UE 100 #1*a*, the SIB including the second resource information, into the cell #1, only when the frequency band #1 used by the eNB 200 #1 and the frequency band available for the D2D proximity service in the eNB 200 #2 (cell #2) are different. According thereto, when the frequency band #1 used by the eNB 200 #1 and the frequency band available for the D2D proximity service in the eNB 200 #2 (cell #2) are the same, the UE 100 #1 is capable of using the frequency band available for the D2D proximity service in the eNB 200 #2, and thus, it is possible to omit an unnecessary signaling.

In the first and second operations according to the above-described second embodiment, the eNB 200 #1 and the eNB 200 #2 may transmit and receive the D2D resource information by tunneling. Further, the eNB 200 #1 (and/the eNB 200 #2) may transmit the D2D resource information via X2/S1 interfaces.

In the modification of the second operation according to the above-described second embodiment, when the management server (Server) belonging to the PLMN #1, that is, when the management server is an entity of the EPC 20 belonging to the PLMN #1, it is possible to omit a process in step S505 (admission of the NW #1). The management server may transmit a response (Response) to the configuration request from the eNB 200 #1, to the eNB 200 #1.

In the above-described second embodiment, description proceeds with a case where the D2D resource information is the Discovery resource information and/or Communication resource information; however, the D2D resource information may be a radio resource available for the D2D synchronization procedure. That is, the D2D resource information may be information indicating a radio resource used for transmitting and receiving the D2D synchronization signal in the D2D synchronization signal. Alternatively, the D2D resource information may be a radio resource available for transmitting and receiving a control signal including information (Scheduling Assignment (SA)) indicating a location of a radio resource used for transmitting user data in the D2D communication (that is, for receiving D2D communication data).

Therefore, the frequency band indicated by the frequency resource information is a frequency band available for transmitting and receiving at least any one of: the D2D discovery signal; the D2D communication signal; the D2D synchronization signal; and the control signal including information indicating the SA.

In the above-described second embodiment, it is possible to combine a plurality of operation examples including each modification, where appropriate. For example, the eNB 200 #1 may receive the second D2D resource information from the eNB 200 #2, and receive the second D2D resource information from the UE 100 #1.

In the above-described second embodiment, description proceeds with an example where the UE 100 #1 and the UE 100 #2 belong to different PLMNs. However, the UE 100 #1 and the UE 100 #2 may belong to the same PLMN assuming that different frequency bands are used for the D2D proximity service. Therefore, between the eNBs 200 belonging to the same PLMN, it is possible to apply the present disclosure.

Figure 16:
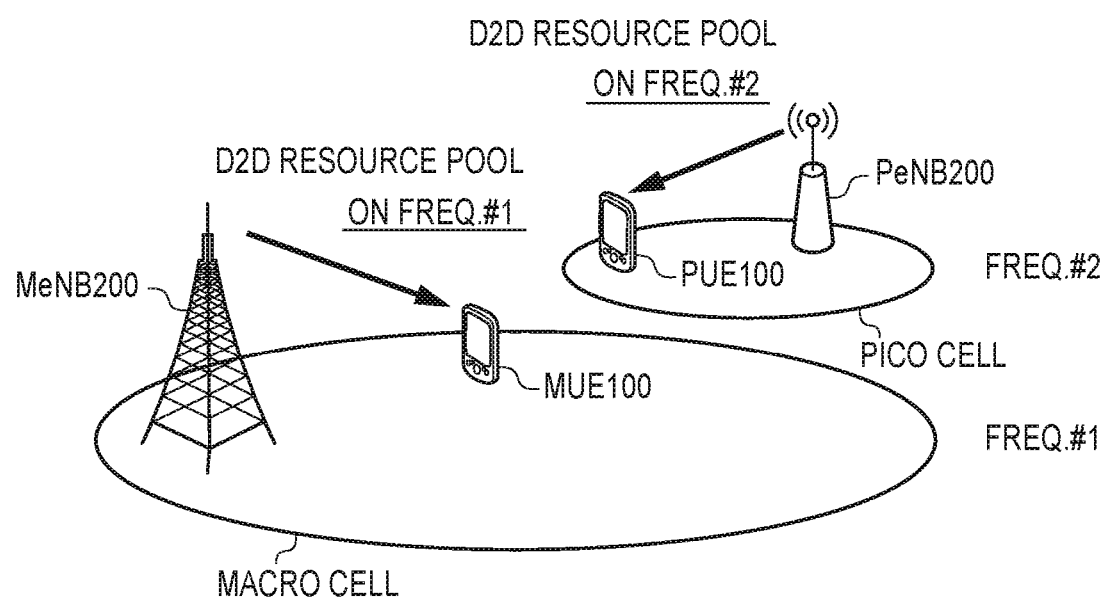
FIG. 16 is a diagram showing an operation environment according to another embodiment.

For example, in the operation environment as shown in FIG. 16, the below-described method may be performed. FIG. 16 is a diagram showing an operation environment according to the other embodiment.

As shown in FIG. 16, the frequency band #1 (Freq. #1) is assigned to MeNB 200, and the MeNB 200 manages a macro cell of the frequency band #1 (Freq. #1). Here, description proceeds with an assumption where the MeNB 200 sets the D2D resource available for the D2D proximity service within the range of the assigned frequency band #1. The MeNB 200 transmits the D2D resource information (D2D resource notification) in the macro cell, to MUE 100 that exists in the macro cell that is a cell of the MeNB 200. The MUE 100 uses the D2D resource set within the range of the frequency band #1, on the basis of the received D2D resource information, to thereby use the D2D proximity service.

PeNB 200 is installed within the macro cell. The frequency band #2 (Freq. #2) different from the frequency band #1 is assigned to the PeNB 200, and the PeNB 200 manages a pico cell of the frequency band #2 (Freq. #2). Here, description proceeds with an assumption where the PeNB 200 sets the D2D resource available for the D2D proximity service within the range of the assigned frequency band #2. The PeNB 200 transmits the D2D resource information (D2D resource notification) in the pico cell, to PUE 100 that exists in the pico cell that is a cell of the PeNB 200. The PUE 100 uses the D2D resource set within the range of the frequency band #2, on the basis of the received D2D resource information, to thereby use the D2D proximity service.

In such a case, even when the MUE 100 and the PUE 100 are located within the physically short distance, the D2D resource available, for the MUE 100, to the D2D proximity service does not match the D2D resource available, for the PUE 100, to the D2D proximity service, and thus, it is not possible to start the D2D communication between the MUE 100 and the PUE 100. In such a case, when the following method is performed, it becomes possible to start the D2D communication between the MUE 100 and the PUE 100 that exist in different cells assuming that different frequency bands are used for the D2D proximity service.

Figure 17:
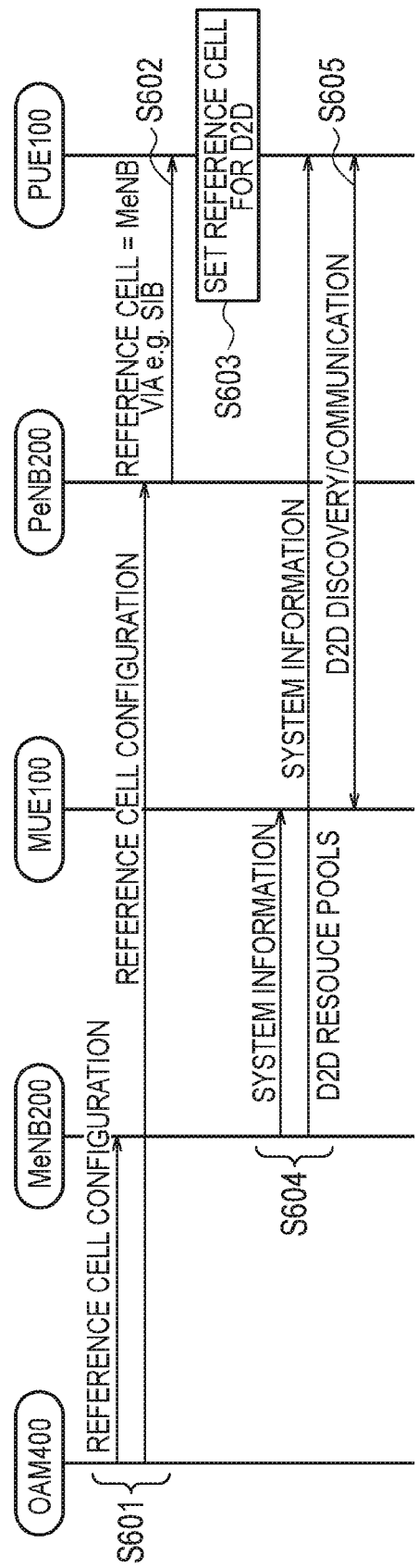
FIG. 17 is a sequence chart for describing a first method according to the other embodiment.

In a first method, the PUE 100 receives the D2D resource information in the macro cell, similarly to the above-mentioned first operation. By using FIG. 17, the first method will be described. FIG. 17 is a sequence chart for describing the first method according to the other embodiment.

As shown in FIG. 17, in step S601, OAM 400 transmits reference cell configuration information (Reference cell configuration) to the MeNB 200 and the PeNB 200.

Here, the reference cell configuration information includes a cell identifier indicating a neighboring cell. Therefore, the MeNB 200 receives the reference cell configuration information including the cell identifier of the pico cell managed by the PeNB 200 and the PeNB 200 receives the reference cell configuration information including the cell identifier of the macro cell managed by the MeNB 200.

In step S602, the PeNB 200 transmits macro cell information relating to the macro cell, to the PUE 10, in order to limit a target of the D2D communication. The PeNB 200 is capable of transmitting, by broadcast, the SIB including the macro cell information, into the pico cell. The PUE 100 receives the macro cell information.

The macro cell information includes a cell identifier of a macro cell. Further, the macro cell information may include information indicating the frequency band #1 in which the macro cell operates.

In step S603, the PUE 100 sets the macro cell as a cell in which the D2D resource information is to be received (that is, to be acquired), on the basis of the macro cell information.

In step S604, the MeNB 200 transmits, by broadcast, the SIB (D2D resource notification) including the D2D resource information (D2D resource pools) in the macro cell, into the macro cell. On the other hand, the PUE 100 discovers the macro cell by the cell search. The PUE 100 may scan the frequency band #1, when the information indicating the frequency band #1 is included in the macro cell information.

The discovered macro cell is set as a cell from which the D2D resource information is to be received, and thus, the PUE 100 decodes the SIB from the MeNB 200 to receive (acquire) the D2D resource information of the macro cell.

In step S605, the PUE 100 uses the radio resource based on the received D2D resource information to perform the D2D discovery procedure, and then the PUE 100 performs the D2D communication with the MUE 100.

According to the first method, even when the eNB 200 (MeNB 200/PeNB 200) notifies the UE (MUE 100/PUE 100) of the own cell, of only the D2D resource set within the range of the assigned frequency band, the D2D communication is possible between the UEs existing in the different cells.

Figure 18:
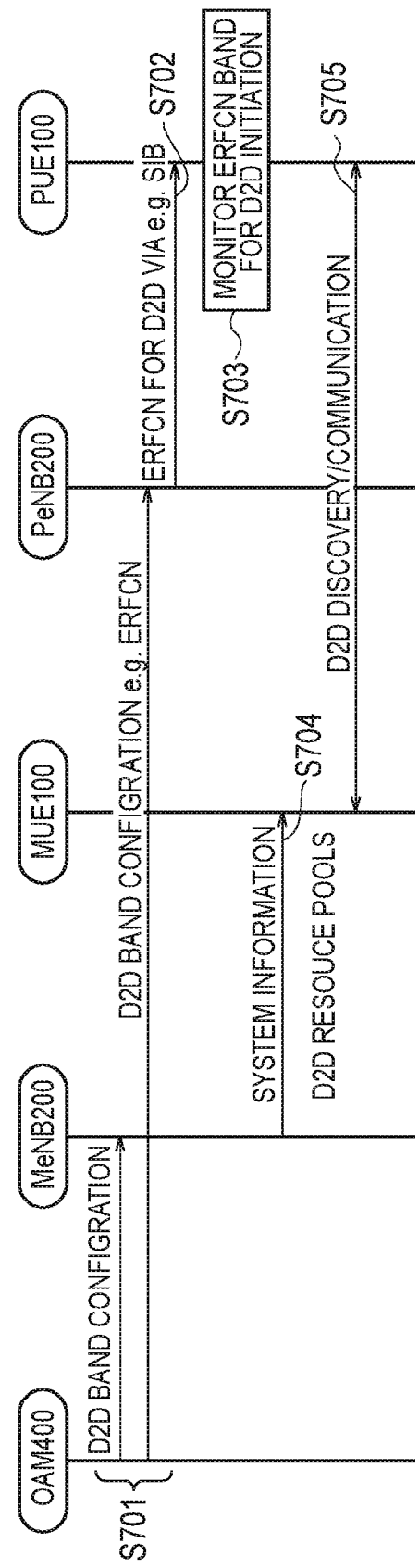
FIG. 18 is a sequence chart for describing a second method according to the other embodiment.

In a second method, similarly to the above-described second operation, the PUE 100 receives the D2D resource information in the macro cell, from the PeNB 200. By using FIG. 18, the second method will be described. FIG. 18 is a sequence chart for describing the second method according to the other embodiment.

As shown in FIG. 18, in step S701, the OAM 400 transmits D2D frequency band configuration information (D2D band configuration) to the MeNB 200 and the PeNB 200.

Here, the D2D frequency band configuration information includes EARFCN (E-UTRA ARFCN) that is identification information of a frequency indicating a D2D resource pool in a neighboring cell. Therefore, the MeNB 200 receives the identification information of the frequency indicating the D2D resource pool in the pico cell managed by the PeNB 200, and the PeNB 200 receives the identification information of the frequency indicating the D2D resource pool in the macro cell.

In step S702, the PeNB 200 transmits the identification information of the frequency indicating the D2D resource pool in the macro cell, to the PUE 100. The PeNB 200 is capable of transmitting, by broadcast, the SIB including the identification information of the frequency, into the pico cell. The PUE 100 receives the identification information of the frequency indicating the D2D resource pool in the macro cell.

In step S703, the PUE 100 starts monitoring the frequency band indicated by the identification information of the frequency. Specifically, the PUE 100 starts scanning the frequency band of a D2D transmission resource pool included in the D2D resource pool.

In step S704, the MeNB 200 transmits the D2D resource pool in the macro cell, to the MUE 100.

In step S705, the MUE 100 uses the radio resource in the D2D transmission resource pool included in the received D2D resource pool to perform a D2D discovery procedure. Specifically, the MUE 100 transmits the Discovery signal by using the radio resource. On the other hand, the PUE 100 which monitors the frequency band of the D2D transmission resource pool in the macro cell receives the Discovery signal from the MUE 100, and discovers the MUE 100. Thereafter, between the MUE 100 and the PUE 100, the D2D communication is started.

In a third method, the PUE 100 monitors a predetermined frequency band, on the basis of configuration information (pre-config.) previously set to the PUE 100.

To the PUE 100, the identification information of a frequency including the frequency band of the D2D resource pool in the macro cell is previously set as the configuration information. The PUE 100 starts monitoring the frequency band, on the basis of the identification information of the frequency. The subsequent operations are similar to those in the above-described second method.

Figure 19:
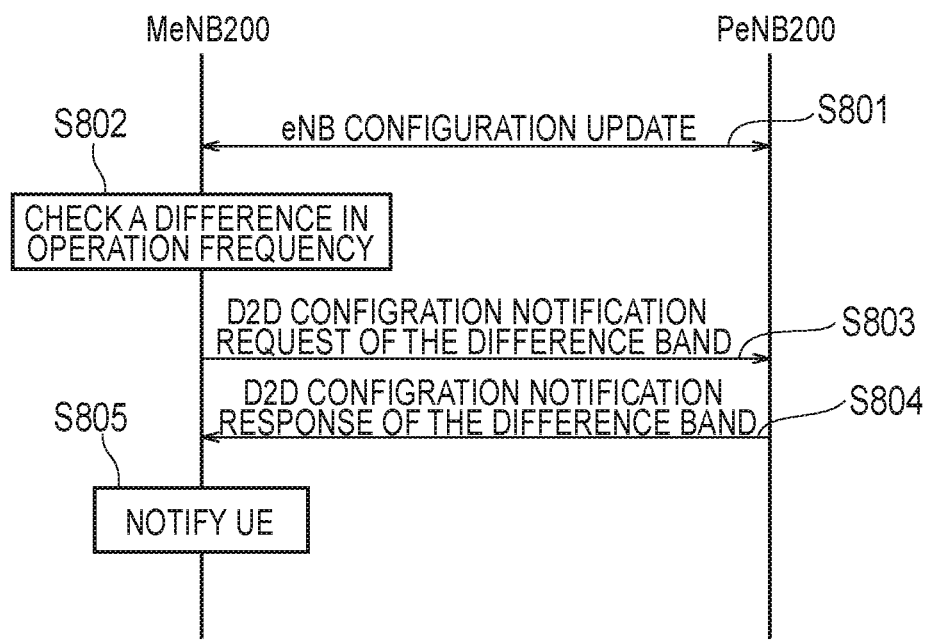
FIG. 19 is a sequence chart for describing a fourth method according to the other embodiment.

In a fourth method, the MeNB 200 requests the D2D resource to the PeNB 200 that operates the cell in an operation frequency different from an operation frequency of the own cell. By using FIG. 19, the fourth method will be described. FIG. 19 is a sequence chart for describing the fourth method according to the other embodiment.

It is noted that description proceeds with an assumption that the eNB 200 (MeNB 200/PeNB 200) notifies the UE (MUE 100/PUE 100) of the own cell, of the D2D resource set within the range of the assigned frequency band.

As shown in FIG. 19, in step S801, the MeNB 200 and the PeNB 200 exchange the information on the own cells, by using eNB Configuration update. The information on the own cells includes information indicating the operation frequency of the own cells.

In step S802, the MeNB 200 determines whether or not the operation frequency of the own cell and the operation frequency of the cell managed by the PeNB 200 match. The MeNB 200 ends the process when these operation frequencies match. On the other hand, the MeNB 200 checks a difference in operation frequency when these operation frequencies do not match. Specifically, the MeNB 200 specifies the operation frequency of the pico cell.

In step S803, the MeNB 200 transmits a D2D configuration notification request of the specified operation frequency (difference band), to the PeNB 200. The D2D configuration notification request includes information indicating the specified operation frequency.

In step S804, the PeNB 200 that receives the D2D configuration notification request transmits to the MeNB 200 a D2D configuration notification response including the information indicating the configuration of the D2D resource in the own cell in which the specified operation frequency is used.

The information indicating the configuration of the D2D resource may be information indicating the configuration of the D2D resource pool (D2D transmission resource pool/D2D reception resource pool), and may be information indicating the configuration of the D2D resource pool (Discovery resource information and/or Communication resource information) for each type of the D2D proximity service.

In step S805, the MeNB 200 notifies the MUE 100 of at least part of the D2D resource information indicating the configuration of the D2D resource in the pico cell, on the basis of the D2D configuration notification response. For example, the MeNB 200 does not notify the UE 100 of information on an unpermitted D2D resource when the D2D resource in the pico cell includes the D2D resource not permitted in the macro cell.

According to the fourth method, even when only the D2D resource set within the range of the assigned frequency band is notified to the UE (MUE 100/PUE 100) of the own cell, the D2D communication is possible between the UEs existing in the different cells.

It is noted that the relationship between the MeNB 200 and the PeNB 200 may reverse. That is, the PeNB 200 may transmit the D2D configuration notification request to the MeNB 200. Further, between the eNBs 200 on equal terms, the fourth method may be performed.

Figure 20:
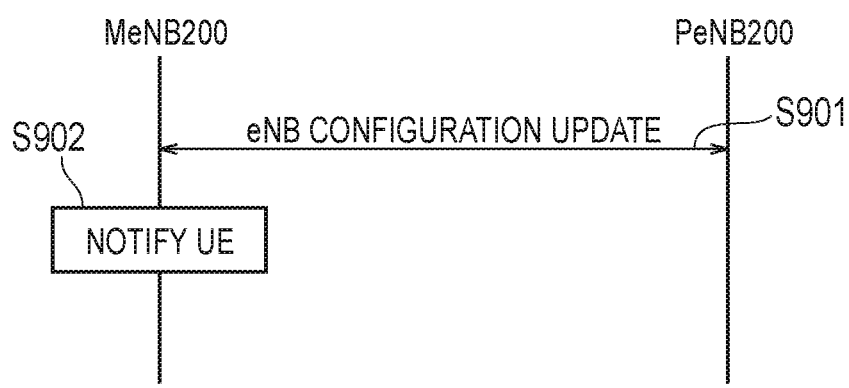
FIG. 20 is a sequence chart for describing a fifth method according to the other embodiment.

In a fifth method, the MeNB 200 and the PeNB 200 exchange the D2D resource information by using an eNB configuration update. By using FIG. 20, the fifth method will be described. FIG. 20 is a sequence chart for describing the fifth method according to the other embodiment.

As shown in FIG. 20, in step S901, the MeNB 200 and the PeNB 200 exchange the information on the own cells, by using the eNB configuration update. The information on the own cells includes the D2D resource information indicating the configuration of the D2D resource in the own cells.

In step S902, when the operation frequency of the macro cell and the operation frequency of the pico cell managed by the PeNB 200 do not match, the MeNB 200 notifies the MUE 100 of at least part of the D2D resource information indicating the configuration of the D2D resource in the cell of the unmatched operation frequency. Further, similarly to the MeNB 200, the PeNB 200 may notify the PUE 100 of at least part of the D2D resource information indicating the configuration of the D2D resource in the cell of the unmatched operation frequency.

It is noted that between the eNBs 200 on equal terms, the fifth method may be performed.

Further, in each of the above-described embodiments, the UE 100 may use the frequency (band) indicated by the D2D resource information, and in addition, may use a frequency band other than the frequency (band) indicated by the D2D resource information, in the D2D proximity service (such as, the D2D discovery procedure and the D2D communication). For example, when the D2D resource information is a list of frequencies available for the D2D proximity service (D2D frequency list), the UE 100 is capable of (attempting to) transmit or receive the D2D radio signal in the frequency other than the frequency present in the D2D frequency list. As a result, the UE 100 is capable of using the D2D proximity service also in a frequency not indicated in the D2D frequency list.

Figure 21:
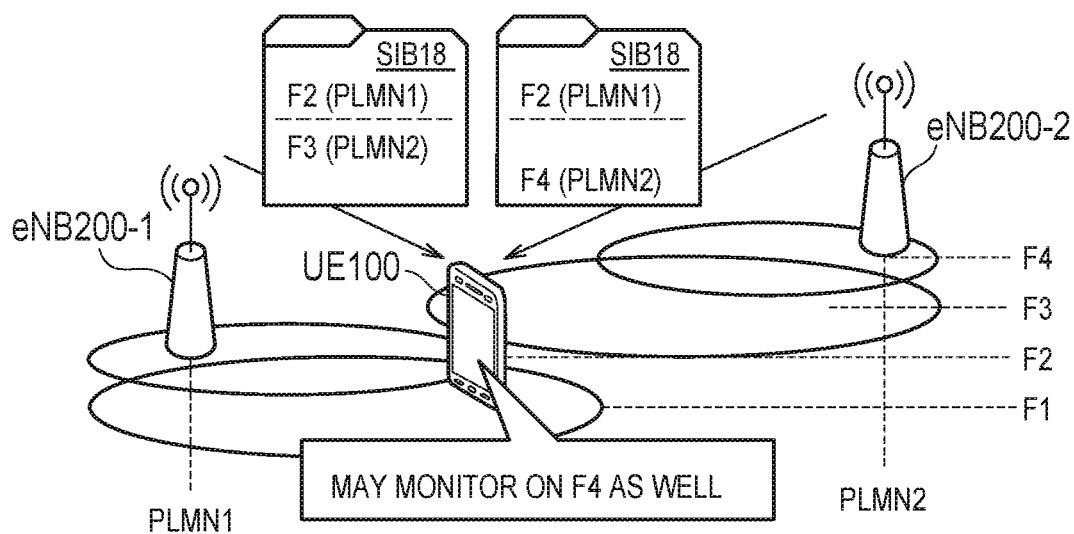
FIG. 21 is a diagram showing one example of an operation environment according to another embodiment.

For example, as shown in FIG. 21, a case is assumed where the eNB 200-1 belonging to the PLMN 1 broadcasts the D2D frequency list by an SIB18 and where the UE 100 that exists in the cell belonging to a frequency F1 of the PLMN 1 receives, as the D2D resource information, the D2D frequency list from the eNB 200-1 (the cell). The D2D frequency list (hereinafter, "first D2D frequency list") includes information indicating a frequency F2 belonging to the PLMN 1 and a frequency F3 belonging to the PLMN 2, as a D2D frequency (band) available for the D2D proximity service (for example, in the D2D discovery procedure). The UE 100 is capable of finding a cell belonging to the frequency F3 by the cell search, on the basis of the first D2D frequency list.

On the other hand, the UE 100 receives a D2D frequency list (hereinafter, "second D2D frequency list") from the cell (eNB 200-2) belonging to the frequency F3 of the PLMN 2. The second frequency list includes information indicating the frequency F1 belonging to the PLMN 1 and a frequency F4 belonging to the PLMN 2. In this case, the UE 100 uses the frequency F4 not included in the first D2D frequency list to thereby transmit or receive the D2D discovery signal. Further, the UE 100 may transmit or receive the D2D radio signal, in PLMN other than the PLMN to which the frequency present in the D2D frequency list belongs.

Alternatively, the UE 100 may have to transmit or receive the D2D radio signal only in the frequency present in the D2D frequency list. In the frequency not present in the D2D frequency list, it is highly probable that the D2D proximity service is not used, and thus, the UE 100 is capable of reducing transmission or reception of an unnecessary D2D radio signal. Further, it is possible to reduce interference applied to communication (for example, cellular communication) performed in the frequency not present in the D2D frequency list. Therefore, the UE 100 may use the frequency not present in the D2D frequency list only when the use of the frequency not present in the D2D frequency list is permitted (or not prohibited) from a network (including the eNB). Otherwise, the UE 100 may not use the frequency not present in the D2D frequency list.

Further, the UE 100 may apply priority to the frequency when the D2D radio signal is transmitted or received in a frequency other than the frequency present in the D2D frequency list. For example, the UE 100 may determine the frequency present in the D2D frequency list to be a first priority, and may determine the frequency not present in the D2D frequency list to be a second priority. The UE 100 may transmit or receive the D2D radio signal in the frequency of the second priority only when there is an opportunity of transmitting or receiving the D2D radio signal after transmitting or receiving the D2D radio signal in the frequency of the first priority or only when an opportunity of transmitting or an opportunity of receiving the D2D radio signal is added after transmitting or receiving the D2D radio signal in the frequency of the first priority. Alternatively, when the UE 100 receives, by the SIB, a frequency list indicating another frequency band different from the serving cell and information indicating the priority (cellReselectionPriority), from the eNB 200, the UE 100 may apply priority to the frequencies present in the D2D frequency list (and not present in the D2D frequency list), on the basis of the information indicating the priority. The UE 100 may apply priority to the frequency present in the D2D frequency list (and not present in the D2D frequency list), on the basis of a configuration value regarding cell (re-)selection, instead of the information indicating the priority. Further, in addition to the UE 100 applying the priority to the frequency, priority may be previously applied to each of a plurality of frequencies present in the D2D frequency list received from the eNB 200 (for example, the serving cell and/or another cell). The UE 100 may receive information indicating the priority of each of the plurality of frequencies together with the D2D frequency list, from the eNB 200. Alternatively, the plurality of frequencies present in the D2D frequency list may be arranged in descending (or ascending) order of priority.

Further, the UE 100 may perform cell (re-)selection, on the basis of the priority of the D2D frequency. For example, the UE 100 may preferentially select a cell that supports the D2D frequency having a higher priority (that is, a cell in which the frequency (band) of the cell is a D2D frequency having a higher priority). Alternatively, the UE 100 may not select a cell that supports a D2D frequency having a lower priority (that is, a cell in which the frequency (band) of the cell is a D2D frequency having a lower priority). Alternatively, the UE 100 may use, as an offset value of a determination formula (such as, Srxlev, Squal, Rs, and Rn) for cell (re-)selection, a value according to the priority of the D2D frequency. The UE 100 may acquire, by the SIB, the offset value together with the D2D frequency list, from the eNB 200. In this way, in addition to directly using the D2D resource information (information included in the D2D resource notification) for the D2D proximity service (for example, monitoring the D2D discovery signal), the UE 100 is capable of using the same for other purposes (for example, cell selection).

Further, the UE 100 may perform cell (re-)selection in accordance with an interest in the D2D proximity service. For example, the UE 100 may preferentially select the cell that supports the D2D frequency present in the D2D frequency list, when the UE 100 is interested in transmission in the D2D proximity service. Further, when the UE 100 is interested only in reception in the D2D proximity service, the UE 100 may select the cell that supports the D2D frequency to camp it on. It is noted that even when the UE 100 is interested only in reception in the D2D proximity service, the UE 100 may perform cell selection as usual and perform monitoring in the frequency present in the D2D frequency list.

Further, in each of the above-described embodiments, when the UE 100 receives the D2D resource information from each of a plurality of cells (plurality of eNBs 200), the UE 100 may use the D2D proximity service on the basis of the plurality items of the received D2D resource information. For example, when each item of the D2D resource information is a D2D frequency list, the UE 100 may transmit or receive the D2D radio signal in frequencies (for example, all the frequencies indicated by an OR operation (logical addition)) present in at least one of the plurality of D2D frequency lists. As a result, the UE 100 becomes capable of using the maximum number of frequencies available for the D2D proximity service, and thus, a large number of UEs may become a partner terminal of the D2D proximity service. Alternatively, the UE 100 may transmit or receive the D2D radio signal in frequencies (for example, all the frequencies indicated by an AND operation (logical multiplication)) commonly present in a plurality of D2D frequency lists. As a result, the UE 100 is capable of using a frequency which is most likely used. Alternatively, the UE 100 may calculate a difference in a plurality of D2D frequency lists, and notify the eNB 200 (for example, the serving cell) of frequencies (for example, all the frequencies indicated by an XOR operation (exclusive OR)) present only in each of the plurality of D2D frequency lists. Similarly to the above-described other embodiment (see FIG. 19), the eNB 200 may update, on the basis of the notification from the UE 100, the D2D resource information (for example, the D2D frequency list) on the own cell and/or the D2D resource information of another eNB 200 (for example, an Inter-PLMN list), held by the eNB 200. The eNB 200 may transmit, by the SIB (for example, the SIB18), the updated D2D resource information. Further, the eNB 200 may inquire the network (for example, a management server that manages at least a frequency band available for the D2D proximity service) as to whether the information included in the notification from the UE 100 is correct. When the information included in the notification from the UE 100 is correct or when the information included in the notification from the UE 100 is authenticated by the network, the eNB 200 may update the D2D resource information.

Further, in the second modification of the second operation according to the above-described second embodiment, the eNB 200 #1 broadcasts the second D2D resource information (that is, the latest second D2D resource information in the eNB 200 #1) updated to notify another UE (specifically, the UE 100 #1b) of the second D2D resource information received from the UE 100 #1a, into the cell #1; however, this is not limiting. For example, the eNB 200 #1 may transmit the latest second D2D resource information by dedicated signaling to all the UEs 100 interested in the D2D proximity service. In this case, the eNB 200 #1 may not transmit the latest second D2D resource information to the UE 100 #1a that has reported the second D2D resource information.

Further, the UE 100 #1a may transmit, to the eNB 200 #1 (serving cell) by ProSe Indication, the second D2D resource information received from the eNB 200 #2. The ProSe Indication is a message for transmitting the information on the D2D proximity service to the eNB. For example, the ProSe Indication is a message including interest information in the D2D proximity service (information indicating an interest in the D2D proximity service/information indicating no interest any more in the D2D proximity service).

Further, the UE 100 #1a may transmit the second D2D resource information to the eNB 200 #1 in response to an individual request (inquiry) from the eNB 200 #1. Alternatively, the UE 100 #1a may transmit the second D2D resource information to the eNB 200 #1, on the basis of the information (for example, the SIB) broadcast from the eNB 200 #1. For example, when the information broadcast from the eNB 200 #1 includes the information for requesting to report the second D2D resource information, the UE 100 #1a may transmit the second D2D resource information to the eNB 200 #1. Otherwise, the UE 100 #1a may not transmit the second D2D resource information to the eNB 200 #1. Alternatively, only when the second D2D resource information received from the eNB 200 #1 and the second D2D resource information received from the eNB 200 #2 are different, the UE 100 #1a may transmit, to the eNB 200 #1, the second D2D resource information received from the eNB 200 #2. As a result, it is possible to avoid a situation where all the UEs 100 that exists in the eNB 200 #1 report the D2D resource information received from another eNB.

Further, the UE 100 #1a may transmit, to the eNB 200 #1, all the second D2D resource information received from the eNB 200 #2, or may transmit, to the eNB 200 #1, at least part of the second D2D resource information. For example, when the second D2D resource information indicates a plurality of D2D frequencies, the UE 100 #1a may omit transmission of the information indicating a D2D frequency overlapping a D2D frequency indicated by the first D2D resource information received from the eNB 200 #1 (serving cell).

It is noted that the eNB 200 #1 may determine, on the basis of whether SIB Modification Period expires, whether the eNB 200 #1 includes the information for requesting to report the second D2D resource information into the information to be broadcast. Specifically, when the SIB Modification Period expires, the eNB 200 #1 may not include the information for requesting to report the second D2D resource information into the information to be broadcast, and when the SIB Modification Period does not expire, the eNB 200 #1 may include the information for requesting to report the second D2D resource information into the information to be broadcast. The eNB 200 #1 is capable of broadcasting the SIB including the second D2D resource information updated by the second D2D resource information reported from the UE, into the cell #1. It is noted that the SIB Modification Period is calculated by an actual modification period expressed by the number of radio frames (modificationPeriodCoeff)*an initial paging cycle (defaultPagingCycle).

Further, in the above-described second embodiment (in particular, the second operation), the eNB 200 (for example, the eNB 200 #2) transmits the SIB (SIB including the first D2D resource information, for example) including the information on the frequency band available for the D2D proximity service in another cell. In this case, the first D2D resource information included in the SIB transmitted by the eNB 200 #2 may be the same in content as the first D2D resource information transmitted by the eNB 200 #1, and may be at least part of the first D2D resource information transmitted by the eNB 200 #1.

Further, in the above-described second embodiment, the UE 100 may preferentially use the first D2D resource information when the UE 100 holds the first D2D resource information in the serving cell and the second D2D resource information in another cell (or another PLMN). For example, when at least part of the D2D resource pool available for the D2D proximity service in the serving cell overlap the D2D resource pool available for the D2D proximity service in another cell in a time direction, the UE 100 may preferentially use, in the overlapping portion, the D2D resource pool in the serving cell for the D2D proximity service (for example, reception of the D2D discovery signal). It is noted that the UE 100 may preferentially use the D2D resource pool (for example, the transmission resource pool) in the serving cell over the D2D resource pool (for example, the reception resource pool) in another cell, when the UE 100 comprises only one radio transceiver 110.

Further, in the above-described first embodiment, in order that the D2D communication is enabled without reducing the radio resources available for the cellular communication, the frequency band different from the frequency band (specifically, 800 MHz band) to which the serving cell (specifically, cell #2) belongs is made to be used for the D2D communication. That is, even when the serving cell does not support the D2D proximity service (for example, the D2D communication), the serving cell may transmit the information indicating the frequency band available for the D2D proximity service (for example, the D2D frequency list). Further, when the serving cell does not support the D2D proximity service, the serving cell may transmit not only the information indicating the frequency band available for the D2D proximity service, but also (at least part of) the D2D resource information which a cell supporting the D2D proximity service transmits to subordinate UEs by using the SIB18. Alternatively, when the eNB 200 does not support the D2D proximity service in all of the cells of the eNB 200, the eNB 200 may transmit the D2D resource information. It is noted that the eNB 200 that does not support the D2D proximity service may be a legacy eNB 200 not capable of transmitting, because of lack of capability, the D2D resource information by the SIB and/or dedicated signaling, may be an eNB 200 that does not (temporarily) permit the D2D proximity service, and may be an eNB 200 that (temporarily) prohibits the D2D proximity service.

In the above embodiments, as one example of a mobile communication system, the LTE system is explained. However, the present disclosure is not limited to the LTE system, and the present disclosure may be applied to systems other than the LTE system.

Additional Statement

[1] Introduction

Agreements
Inter-Frequency and Inter-PLMN discovery for monitoring UEs will be supported.
An eNB may provide in SIB a list of (intra-PLMN-inter-frequency and/or inter-PLMN-inter-frequency) carriers (possibly with the corresponding PLMN ID) on which the UE may aim to receive ProSe discovery signals.
A cell does not provide detailed ProSe configuration (SIB18) for other carriers. If a UE wants to receive ProSe discovery signals on another carrier, it needs to read SIB18 (and other relevant SIB) from there.
FFS (For Further Study) whether (as a configuration) option an eNB may provide detailed ProSe Discovery information about other intra-PLMN carriers.
FFS whether the list of other ProSe carriers could alternatively be provided by higher layers for inter-PLMN carriers.
UEs transmit ProSe discovery signals only on their serving cell (if authorized by the NW).
Intra- and inter-frequency (and inter-PLMN) ProSe reception does not affect Uu reception (e.g. UEs use DRX occasions in IDLE and CONNECTED to perform ProSe discovery reception or it uses a second RX chain if available). The UE shall not create autonomous gaps.
If the UE has to obtain ProSe discovery configuration from the SIB of an inter-frequency cell, this does not affect the UE's Uu reception on the serving cell(s).

An RRC CONNECTED UE interested (or no longer interested) in intra- or inter frequency ProSe discovery reception indicates this by sending a "ProSe indication" to the eNB.

In this Additional statement, the remaining issues to support inter-frequency and inter-PLMN discovery (a D2Ddiscovery procedure in between different frequencies and in between different PLMNs) are discussed along with possible solutions.

[2] Remaining Issues in Inter-PLMN Discovery Aspect

In this section, we discusses on inter-frequency/inter-PLMN discovery.

(2.1) FFS on Whether Higher Layer Provides Inter-PLMN Carrier List

It was captured that FFS whether the list of other ProSe carriers could alternatively be provided by higher layers for inter-PLMN carriers, which may be useful for the UE in case where the serving cell cannot provide SIB18 for some reason. However, to inherit the existing concept, we assume RAN (Radio Access Network) itself should have a responsibility to decide operating frequencies of own cells and to determine which carrier supports discovery. In addition, the higher layer, i.e. ProSe Function, cannot provide the list of carriers for ProSe discovery (D2D discovery procedure) at this point, i.e. it may only provide the radio parameters to be used for ProSe direct communication when not served by E-UTRAN. So, to introduce such higher layer signallings will need to introduce additional interfaces between RAN and ProSe Function. Therefore, we propose that at least Rel-12 should not support the list of other carriers for inter-PLMN ProSe discovery provided by higher layers.

Proposal 1: At least in Rel-12, it should assume only RAN provides the list of inter-PLMN frequencies which support ProSe discovery.

(2.2) Further Clarifications of Current Agreements (2.2.1) UE Behaviour Upon Reception of the List of ProSe Discovery Carriers An eNB may provide in SIB a list of carriers on which the UE may aim to receive ProSe discovery signals. This sounds like the list is either restriction or assistance for the UE or both. Since the monitoring of inter-PLMN discovery signals will be performed after the existing PLMN selection procedure, we need to define the UE behaviour upon reception of the list more clearly. We see it's preferable the list is just for assistance information for the monitoring UE to reduce unnecessary power consumption, i.e. the UE may or may not monitor only ProSe discovery signals transmitted on the carriers provided in the list. It intends, for example, if the UE notices additional ProSe carriers (D2D frequencies) in the list in the other PLMN's SIB18 (i.e. PLMN 2), where the additional ProSe carriers were not listed in the serving cell's SIB18 (i.e. PLMN 1), then the UE may monitor discovery signals transmitted on the additional ProSe carriers, as figured in FIG. 21. Furthermore, it could additionally be considered that the UE may further decide whether to monitor discovery over yet another PLMN (i.e. PLMN 3 not illustrated in FIG. 21) regardless whether the frequency is listed in SIB18 received from PLMN 1 or PLMN 2, as long as the UE has authorization to do so over higher layer and no impact on Uu reception.

Proposal 2: The UE is not required from the serving cell to tune onto carriers other than the ProSe carriers which exist in the list of SIB18. Further it should not be any restriction for the UE to monitor frequencies which do not exist in the list of SIB18.

(2.2.2) Clarification on "ProSe Reception does not Affect Uu Reception"

The above agreements stated that ProSe reception does not affect Uu reception (e.g. UEs use DRX occasions in IDLE and CONNECTED to perform ProSe discovery reception or it uses a second RX chain if available). The main intention of this agreement was for the UE to avoid the use of autonomous gap for ProSe discovery. This means the eNB-configured gap is not considered as affecting Uu reception, which is based on the existing mechanism for measurement gap procedure.

Confirmation 1: An explicit eNB-configured gap is not considered as affecting Uu reception.

ProSe discovery using only DRX occasion may result in degradations of discovery probability, i.e. best-effort discovery. Although a UE capable of dual Rx chains has additional benefits, a single receiver for discovery is currently assumed. Furthermore, it is assumed that non-public safety UE may not be able to receive simultaneously on the DL and UL spectrum of FDD carriers supporting D2D.

Observation 1: If only DRX occasions are used, discovery opportunities may be severely limited.

Considering the potential degradation in using only DRX occasions, the discovery occasions should be based on the existing gap mechanism. However, in order for the gap mechanism to work for discovery, the serving cell should have knowledge of detailed ProSe discovery information about the other inter-PLMN carriers in order to configure the UE, which is interested in discovery monitoring, with appropriate parameters. Since it was agreed that the UE should read SIB18 of the other inter-PLMN carriers to monitor discovery signals transmitted on such carrier, it would be assumed that the UE should have a capability to inform the serving cell of the information which the UE has already obtained. If the serving cell doesn't have any information of detailed ProSe discovery configuration among concerned PLMNs, i.e. no NW-level coordination (i.e. inter-OAM or inter-RAN detailed discovery information sharing) is provided, the following two options could be considered for the serving cell to obtain the information before it decides whether to configure gaps for the UE.

Option 1: The UE forwards the full or subset of SIB18 which is received from inter-PLMN cells (cells belonging different PLMN) to the serving cell. It is FFS when the UE should send inter-PLMN SIB18 information to the serving cell.

Option 2: The UE informs the serving cell of the possible gap occasions, e.g. a gap pattern, which the UE has determined based on SIB18 received from inter-PLMN cells.

From the signalling overhead perspective, Option 2 is more preferable than the Option 1 since Option 1 may require that the UE forwards multiple SIB18s to the serving cell. In comparison, Option 2 only requires that the UE informs the serving cell of the desired gap pattern. It is FFS whether the serving cell could indicate whether inter-PLMN coordination among NWs can be assumed or whether the NW can decide if UE assistance is needed for inter-PLMN discovery.

Proposal 3: The serving cell should configure the UE with gaps for inter-PLMN discovery monitoring (a reception of discovery signal between different PLMNs). The configuration may be based on a gap pattern requested by the UE.

[3] Remaining Issues in Inter-Frequency Discovery Aspect

In this section, we discuss on inter-frequency/intra-PLMN discovery.

(3.1) FFS on Whether (as a Configuration) Option an eNB May Provide Detailed ProSe Discovery Information about Other Intra-PLMN Carriers In contrast to inter-PLMN discovery (D2D discovery procedure in the same PLMN), with intra-PLMN discovery, it may be assumed that the serving cell has knowledge of the detailed ProSe Discovery information of its neighbor cells regardless of whether the serving cell provides the information directly to the UE.

The above FFS suggests that the serving cell may provide not only its SIB18 information but also detailed ProSe Discovery information of other intra-PLMN frequencies. The significance of this FFS is not so much whether the serving cell would provide ProSe discovery information of inter-frequency cells to UEs, but that the serving cells actually has coordination with inter-frequency cells. With only the latter information, it would be possible for the serving cell to configure appropriate gaps for the UE for inter-frequency ProSe discovery without providing detailed information.

Table 1 provides a comparison for the two cases, (1) UE obtain SIB18 directly from other carriers (baseline), (2) UE obtains SIB18 information only from its serving cell (FFS). While both schemes have drawbacks, the FFS scheme (case 2) has benefits to reduce UE complexity and to allow network-configurable operations. The baseline scheme (case 1) depends on the existing DRX mechanism; therefore, even if the UE obtains the SIB18 from the other carriers directly, the information isn't of much use to the UE if the discovery occasions are very limited. Therefore, we propose as a configuration option that an eNB has a capability to provide detailed ProSe Discovery information about other intra-PLMN frequencies (same PLMN frequencies).

TABLE 1

| Item | | UE obtains SIB18 directly from other carriers (case 1: baseline) | UE obtains SIB18 only from serving cell (case 2: FFS) |
|---|---|---|---|
| Network complexity | Signalling overhead per carrier (on SIB or dedicated signalling) | 1 × (SIB18) ☺ | <(number # of frequencies) × (SIB18) ☻ |
| | Monitoring occasion | Up to UE (so far) ☺ | Serving cell assigned gaps ☻ (assuming inter-eNB coordination of ProSe configurations.) |
| | OAM configuration | (number # of cells) ☺ | (number # of cells) × (number # of frequencies) ☻ |
| UE complexity | SIB decoding | (number # of frequencies) ☻ | 1 [only serving cell] ☺ |
| | Monitoring occasion | UE-based decision ☻ (e.g. DRX occasion) UE may inform gap patterns ☻ | Serving cell assigned gaps ☺ |
| Comparison | Benefits ☺ | Lighter signalling Low complex network. Smaller OAM efforts. | UE complexity is reduced. Network-configurable occasion i.e. gap, to ensure discovery performance. |
| | Drawbacks ☻ | UE complexity, which should decode SIBs on each carrier and may decide when it tunes to which carriers. | Heavier signalling load. Network complexity, which needs management of gaps. Bigger OAM efforts on parameter settings for SIB18s. |

Proposal 4: As a configuration option an eNB may provide detailed ProSe Discovery information about other intra-PLMN carriers via SIB and/or dedicated signalling.

Even if the proposal 4 is not agreeable, an alternative scheme is available to be discussed. As shown in Table 1, the network-configurable discovery occasion is beneficial to ensure the discovery performances as well as to reduce UE complexity. It may be assumed that the serving may obtain the SIB18 information of inter-frequency, neighbor cells through OAM With this alternative, the UE does not need to inform the serving cell of full or a subset of SIB18s on other carriers as well as the serving cell does not provide full contents of SIB18 on other intra-PLMN frequencies, but it has a capability to configure the UE with gaps for discovery monitoring. Since the drawback (signalling load) can be removed, this alternative scheme could become a compromise solution.

Proposal 5: Even if it is not agreeable for the serving cell to provide detailed ProSe discovery information to the UE, it should agree that the serving cell should configure the UE with appropriate gaps for discovery monitoring.

Figure 22:
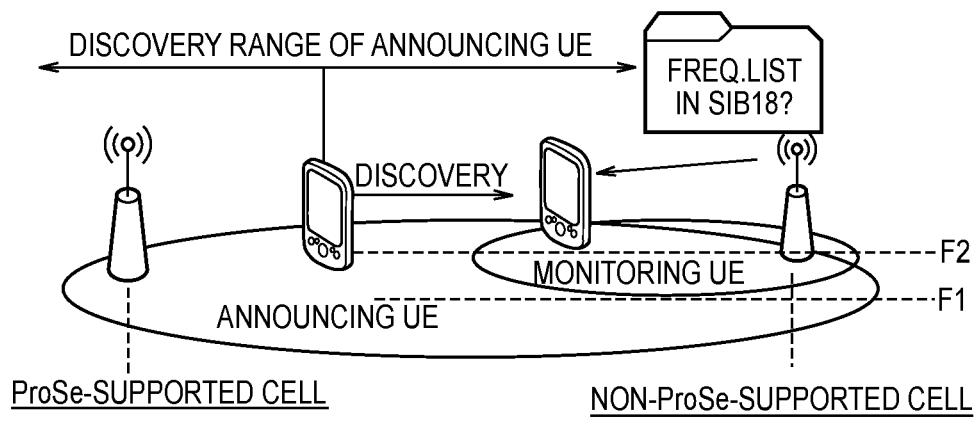
FIG. 22 is a diagram showing a case of monitoring UE camped on non-ProSe supported cell.

(3.2) Further Clarifications of Current Agreements (3.2.1) Whether the Serving Cell not Supporting ProSe Discovery on its Carrier can Provide the List of Other ProSe Carrier Although it was agreed that an eNB may provide in SIB a list of (intra-PLMN-inter-frequency and/or inter-PLMN-inter-frequency) carriers (possibly with the corresponding PLMN ID) on which the UE may aim to receive ProSe discovery signals, it should be clarified whether the serving cell not supporting ProSe discovery on its carrier can provide the list of other ProSe carrier, as depicted in FIG. 22.

FIG. 22 shows an example where the monitoring UE camped on the serving cell which does not support ProSe discovery wants to know the list of carriers which support ProSe discovery. If the serving cell provides the list of carriers in its SIB, the behaviour of the monitoring UE is the same as the agreed inter-frequency discovery.

Proposal 6: The serving cell which does not support ProSe discovery on its carrier should also provide in SIB the list of other ProSe carrier (and detailed ProSe discovery information (if the Proposal 4 is agreeable)).

(3.2.2) NW Behaviour Upon Reception of ProSe Indication

It was agreed that for both ProSe discovery and communication the UE sends ProSe Indication to inform the serving cell of its intention for discovery. For ProSe communication, it was captured that the eNB behaviour upon reception of the ProSe Indication includes the options for handover to move the UE towards the carrier which supports ProSe communication. However, for ProSe discovery the NW behaviour upon reception of the ProSe indication is still unclear; therefore, the UE behaviour is also not clear, e.g. what triggers the UE to transmit ProSe Indication.

Proposal 7: It should discuss the NW's expected behaviour upon reception of the ProSe Indication for discovery.

Some of the candidate NW behaviours are as follows:

(A) Handover; for the purpose of load balancing, the eNB may move the UE to appropriate carrier depending on whether the UE indicates "interested" or "no longer interested" within the ProSe Indication message for discovery (namely, the eNB may have the UE make a handover).

(B) ProSe discovery configuration change; to assign suitable occasion for discovery monitoring, the eNB may reconfigure the UE with either updated DRX parameters or gaps (if proposal 3, 4 or 5 is acceptable), upon reception of the ProSe Indication that the UE is interested in inter-frequency discovery.

Note that the other aspect for reception of intra-frequency interests is discussed.

Observation 2: Upon reception of ProSe indication for discovery, the serving cell has the option to perform handover and/or change the UE's DRX configuration to assist with discovery monitoring.

(3.2.3) ProSe Indication Details (3.2.3.1) Frequency Information

Although it was not discussed for discovery, the ProSe Indication for communication was agreed to include the intended ProSe frequency to support the ProSe communication involving transmission and reception. For discovery purpose, it will be also beneficial to include the intended frequencies in the ProSe Indication. For example, if the UE indicated that the frequency of interest is the serving frequency then handover will likely not be needed.

And if the UE indicated its frequency of interest is a different frequency then it may be necessary for the serving cell to handover the UE to the indicated frequency or at least provide the UE with gaps for monitoring discovery on that frequency. Although the UE may not have any preferences which frequency it's interested in, there are some possibilities in the future whereby an application-specific frequency is indicated in the higher layer or UE has history information regarding discovery on a particular frequency(ies). For example, if the serving cell configured gaps for the UE on a particular frequency and the UE was able to receive the discovery signal of interest on this frequency, it would be helpful if the UE indicates this frequency to the serving cell in case the serving cell subsequently configures gaps for a different frequency of no interest to the UE.

In case the frequency of interest is the serving frequency, it's FFS how the UE would indicate the interest for intra-frequency discovery monitoring, e.g. whether the UE just indicate the serving frequency as the indicated frequency.

Proposal 8: It should agree to allow the UE to include a list of frequencies of interest in the ProSe Indication.

Although it's still FFS whether the ProSe Indication for discovery can also inform of interests for inter-PLMN discovery, the list of frequency in the proposal 8 may be used to distinguish such case by means of, e.g. the serving cell compares the list of frequency in the ProSe Indication and the list of frequency in its own SIB. If the proposal 3 to obtain information to configure gap is acceptable, the serving cell should perform appropriate actions for it upon reception of the ProSe Indicaiton which implies inter-PLMN discovery monitoring.

Proposal 9: It should agree to allow the ProSe Indication to inform of intention for inter-PLMN discovery reception in addition to intra- or inter-frequency discovery.

(3.2.3.2) Independent or Integrated with UE Assistance Information (UEAssistanceInformation)

For a similar functionality with the ProSe Indication, it has been agreed that, as baseline, re-use the UE assistance information message for requesting ProSe discovery resources, which was essentially assumed only for a request of transmission resources for Type 2B discovery (that is, a procedure in which resource for announcing the discovery signal is dedicatedly allocated to each UE). Therefore, the issue is whether the ProSe Indication should be integrated with the baseline agreement. The functions are listed in Table 2.

TABLE 2

| | | UEAssistance Information | ProSe Indication for discovery |
|---|---|---|---|
| Intra-frequency Intention May include inter-cell | Discovery Announcing | Can intend (as request for dedicated resources) | No (yes, if proposal 11 is acceptable) |
| | Discovery Monitoring | No | Yes |
| | Communication Transmission & reception | No | Yes (not restricted to intra-freq.) |
| Inter-frequency Intention May include inter-PLMN | Discovery | No | Yes, without intended freq. (With intended freq., if proposal 8 is acceptable) |
| | Communication Intended frequency | No | Yes |
| Expected eNB behaviour | Discovery | Type 2B transmission resource allocation | May RRM measurement configuration May handover (observation 2) May discovery Configuration change (observation 2) |
| | Communication | None | RRM measurement configuration Handover RRC Connection Release |

In comparison, the UE assistance information was intended for simply request the transmission resource in intra-frequency operation, while the ProSe Indication may have much functionality involving inter-frequency operations. However, no reason can be seen to have two independent messages for similar functionality, unless the eNB and/or UE behaviours are conflicted. Although such confliction may occur when the ProSe Indication indicates interest in intra-frequency discovery announcing if the proposal 11 is acceptable, it can be distinguished by what type of serving cell receives the indication, i.e. either a ProSe-supported cell allocates Type 2B resource or a non-ProSe supported cell may initiate handover. Therefore, to merge both messages into one message is preferable, and if it's acceptable, a new message for the ProSe Indication should be introduced to carry the complex contents, similar with the existing approach for MBMSInterestIndication.

Proposal 10: A single RRC message for the ProSe Indication should be introduced with merging the existing function assigned to the UE assistance information as a baseline.

(3.1.1.2) Announcing Intention

The ProSe Indication for discovery was agreed to inform of the intention for monitoring. In case where the UE wants to perform discovery announcing but is now connected to non-ProSe supported cell (see FIG. 22), it should be considered how to deal with such dead-lock condition for the UE. A possible solution may be to inform the serving cell of the announcing intention in the ProSe Indication, wherein the UE expects the serving cell to perform handover to a ProSe-supported carrier. With this information, the serving cell could for example decide whether it is necessary to handover the UE to a ProSe supported cell. In case the UE has dual receivers and doesn't have intention for discovery announcing, it may suitable to handover the UE to a non-ProSe supported cell (perhaps one that is less congested) and allow the UE to use its $2^{nd}$ receiver for discovery monitoring.

Proposal 11: The UE should inform the serving cell of the intention for discovery announcing.

(3.2.4) Priority Handling in RRC IDLE

Before the discussion on priority handling in RRC IDLE UEs, it should be clarified how to support inter-frequency discovery. In MBMS case, the UE to attempt the MBMS reception should camp on the cell which provides an MBMS service the UE is interested in, as long as the UE has a single receiver. On the other hand, the discovery monitoring seems not to be required camping on the cell which supports ProSe discovery in accordance with the implication, i.e. "Intra- and inter-frequency (and inter-PLMN) ProSe reception does not affect Uu reception (e.g. UEs use DRX occasions in IDLE and CONNECTED to perform ProSe discovery reception or it uses a second RX chain if available). The UE shall not create autonomous gaps." This is likely a similar approach to CRS reception in the existing inter-frequency measurement. However, it's still not clear whether the UE is required to camp on that cell for inter-frequency discovery monitoring.

Figure 23:
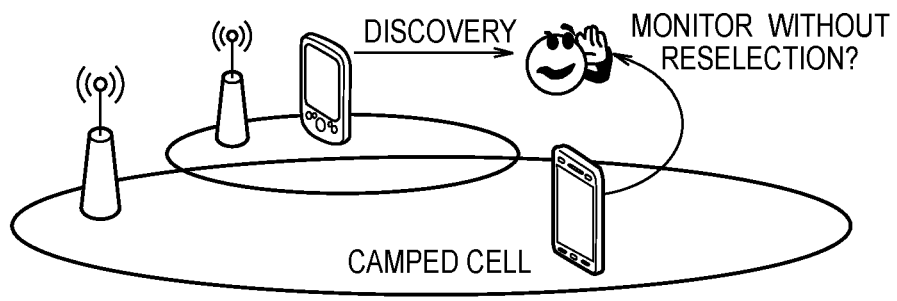
FIG. 23 is a diagram showing discovery monitoring without cell reselection.

Confirmation 2: The UE which attempts inter-frequency (and inter-PLMN) discovery monitoring is not required to camp on the cell which supports ProSe discovery (See FIG. 23).

As discussed in section (3.2.2), the load balancing among inter-frequency cells including non-ProSe supported cells may be optimized using handovers with the ProSe Indication depending on whether the UEs in RRC CONNECTED are interested in ProSe discovery. However, it isn't clear whether there is any need for modifying the existing reselection procedure and priority to accommodate UE's interested in discovery monitoring. In particular, any changes to the reselection procedure and priority should be carefully considered considering the issue with idle mode load balancing that is specifically configured for UEs through Cell-ReselectionPriority provided in SIBS or by dedicated signalling.

At least for UEs no longer interested in ProSe discovery, the UEs should follow the existing reselection priority configured by the eNB.

Observation 3: IDLE UEs no longer interested in ProSe discovery shall follow the existing rules for cell reselection priority.

Then, it should further consider whether the UE in IDLE is allowed to prioritize ProSe discovery over the existing cell reselection procedure when the UE is interested in ProSe discovery. If the inter-frequency cell is not synchronized with the serving cell, it should be considered whether the existing DRX occasions is sufficient for discovery monitoring on another frequency. Additionally if the UE interested in ProSe discovery monitoring also tends to be interested in ProSe discovery announcing, it may be better that the UE camps on a cell operated on a carrier listed in SIB18 because it can avoid to perform reselection before transmitting discovery signals. However, if the UE is only interested in discovery monitoring, there seems to be no overriding reason to prioritize the carrier listed in SIB18 during cell reselection. Therefore, whether or not the prioritization of the ProSe carrier is needed depends on the assumption for the UE being interested in ProSe discovery monitoring.

Proposal 12: It should discuss whether UE being interested in ProSe discovery should be allowed to prioritize for ProSe discovery during cell reselection.

[4] Conclusion

In the Additional statement, the remaining issues for support of inter-frequency and inter-PLMN discovery are discussed and the clarifications on current agreements are provided. The necessary extensions for the discovery monitoring procedure and the ProSe Indication are addressed. Additionally, the consideration on the existing cell reselection procedure is provided.

INDUSTRIAL APPLICABILITY

As described above, the communication control method, the user terminal, and the control apparatus according to the present disclosure are capable of the use of a D2D proximity service without reducing radio resources available for cellular communication, and thus they are useful in a mobile communication field.

The invention claimed is:
1. A communication method, comprising:
broadcasting, from a communication apparatus to a user terminal, system information for Device to Device (D2D) proximity service, by use of a frequency of a serving cell of the user terminal, the communication apparatus managing the serving cell, and
performing, by the user terminal, a discovery procedure in which the user terminal discovers another user terminal, on a basis of the system information, wherein
the system information includes first information, second information, third information, and fourth information,
the first information indicates an available frequency for the discovery procedure,
the second information indicates at least one parameter for calculating transmission power for the discovery procedure,
the available frequency for the discovery procedure is a frequency different from the frequency of the serving cell,
the first information is related to a center frequency of a frequency band of the available frequency for the discovery procedure,
the third information indicates a Public Land Mobile Network (PLMN) identifier for the available frequency, and
the fourth information indicates number of times of re-transmissions of a discovery signal to be re-transmitted by one user terminal in the discovery procedure.
2. A user terminal, comprising:
a processor configured to perform processes of:
receiving system information for Device to Device (D2D) proximity service, by use of a frequency of a serving cell of the user terminal, from a communication apparatus managing the serving cell; and
performing a discovery procedure in which the user terminal discovers another user terminal, on a basis of the system information, wherein
the system information includes first information, second information, third information, and fourth information,
the first information indicates an available frequency for the discovery procedure,
the second information indicates at least one parameter for calculating transmission power for the discovery procedure,
the available frequency for the discovery procedure is a frequency different from the frequency of the serving cell,
the first information is related to a center frequency of a frequency band of the available frequency for the discovery procedure,
the third information indicates a Public Land Mobile Network (PLMN) identifier for the available frequency, and the fourth information indicates number of times of re-transmissions of a discovery signal to be re-transmitted by one user terminal in the discovery procedure.

3. The communication method according to claim 1, wherein
the system information further includes fifth information,
the fifth information indicates information used by the user terminal for cell selection.

4. The user terminal according to claim 2, wherein
the system information further includes fifth information,
the fifth information indicates information used by the user terminal for cell selection.

5. The communication method according to claim 1, wherein
the system information further includes sixth information,
the sixth information indicates a cell identifier to be used as synchronization reference in the discovery procedure.

6. The user terminal according to claim 2, wherein
the system information further includes sixth information,
the sixth information indicates a cell identifier to be used as synchronization reference in the discovery procedure.

* * * * *